(12) United States Patent
Lee et al.

(10) Patent No.: US 11,503,137 B2
(45) Date of Patent: Nov. 15, 2022

(54) ELECTRONIC DEVICE AND METHOD FOR SCHEDULING OF COMMUNICATION DATA LINK THEREOF

(71) Applicant: Samsung Electronics Co., Ltd., Gyeonggi-do (KR)

(72) Inventors: Soonho Lee, Gyeonggi-do (KR); Buseop Jung, Gyeonggi-do (KR); Doosuk Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 125 days.

(21) Appl. No.: 16/720,772

(22) Filed: Dec. 19, 2019

(65) Prior Publication Data
US 2020/0204656 A1    Jun. 25, 2020

(30) Foreign Application Priority Data

Dec. 24, 2018 (KR) .......................... 10-2018-0168619

(51) Int. Cl.
*H04L 69/08* (2022.01)
*H04L 69/16* (2022.01)
(Continued)

(52) U.S. Cl.
CPC .............. *H04L 69/08* (2013.01); *H04L 69/16* (2013.01); *H04L 69/18* (2013.01); *H04L 69/324* (2013.01)

(58) Field of Classification Search
CPC ....... H04L 69/08; H04L 69/324; H04L 69/16; H04L 69/18; H04L 69/24; H04L 67/62;
(Continued)

(56) References Cited

U.S. PATENT DOCUMENTS

| 2015/0341447 A1 | 11/2015 | Patil et al. |
| 2016/0150357 A1 | 5/2016 | Jung et al. |

(Continued)

FOREIGN PATENT DOCUMENTS

KR    101870224    6/2018

OTHER PUBLICATIONS

Wi-Fi Alliance. "Neighbor Awareness Networking Specification" version 3.0, Dec. 10, 2018.*

(Continued)

*Primary Examiner* — Asghar H Bilgrami
(74) *Attorney, Agent, or Firm* — The Farrell Law Firm, P.C.

(57) ABSTRACT

Disclosed is an electronic device including a communication module configured to support a first communication protocol and a second communication protocol, a processor operably connected to the communication module, and a memory storing instructions that enable the processor to establish a first connection based on the first communication protocol with a first external electronic device, identify a second external electronic device and a connection state of the second external electronic device using the second communication protocol, produce a first message, based at least in part on the first connection and the connection state of the second external electronic device, transmit the produced first message to the second external electronic device using the second communication protocol, receive, from the second external electronic device, a second message in response to the first message using the second communication protocol, and schedule a data link based on the second communication protocol.

18 Claims, 22 Drawing Sheets

(51) Int. Cl.
*H04L 69/18* (2022.01)
*H04L 69/324* (2022.01)
*H04L 67/62* (2022.01)
*H04W 4/80* (2018.01)
*H04L 69/24* (2022.01)
*H04W 74/00* (2009.01)
*H04W 74/04* (2009.01)
*H04W 80/02* (2009.01)
*H04W 72/12* (2009.01)
*H04W 8/00* (2009.01)
*H04W 88/06* (2009.01)

(58) Field of Classification Search
CPC ..... H04W 4/80; H04W 80/02; H04W 74/002; H04W 74/04; H04W 72/1205; H04W 8/005; H04W 88/06
See application file for complete search history.

(56) References Cited

U.S. PATENT DOCUMENTS

| | | | |
|---|---|---|---|
| 2016/0165653 A1* | 6/2016 | Liu | H04W 76/14 370/329 |
| 2016/0286572 A1 | 9/2016 | Abraham et al. | |
| 2016/0353470 A1 | 12/2016 | Liu et al. | |
| 2017/0026995 A1* | 1/2017 | Huang | H04W 72/1289 |
| 2017/0317938 A1 | 11/2017 | Abraham et al. | |
| 2017/0347359 A1* | 11/2017 | Yang | H04W 52/24 |
| 2018/0035376 A1* | 2/2018 | Liu | H04W 68/00 |
| 2018/0063863 A1* | 3/2018 | Liu | H04W 72/1205 |
| 2018/0324876 A1 | 11/2018 | Iwami et al. | |
| 2018/0332547 A1* | 11/2018 | Liu | H04W 8/005 |

OTHER PUBLICATIONS

Wi-Fi Alliance, "Neighbor Awareness Networking Specification", Version 3.0, Dec. 10, 2018, 204 pages.
International Search Report dated Mar. 26, 2020 issued in counterpart application No. PCT/KR2019/018020, 3 pages.

* cited by examiner

ELECTRONIC DEVICE AND METHOD FOR SCHEDULING OF COMMUNICATION DATA LINK THEREOF

CROSS-REFERENCE TO RELATED APPLICATION(S)

This application is based on and claims priority under 35 U.S.C. § 119 to Korean Patent Application No. 10-2018-0168619, filed on Dec. 24, 2018, in the Korean Intellectual Property Office, the disclosure of which is incorporated herein by reference in its entirety.

BACKGROUND

1. Field

The disclosure relates generally to an electronic device, and more particularly, to a method of scheduling a communication data link in an electronic device.

2. Description Of Related Art

With the recent development of digital technology, various types of electronic devices, such as mobile communication terminals, smart phones, tablet personal computers (PCs), notebooks, wearable devices, digital cameras, personal computers, and Internet-of-things (IoT) devices, have been widely used. Various types of proximity services utilizing low-power discovery technology employing short-range communication technology have also been developed in recent years. For example, a proximity communication service in which neighboring electronic devices are able to quickly exchange data through a proximity network is being developed. Proximity services may include low-power proximity services using Bluetooth™ low energy (BLE) beacons or proximity services utilizing low-power short-range communication technology based on neighbor awareness networking (NAN) (e.g., Wi-Fi aware) in a wireless local area network (WLAN) (hereinafter, NAN).

In a NAN-based low-power proximity service (hereinafter, a proximity service), a proximity network that is dynamically changed according to the movement of the electronic device is configured and used, and a set of electronic devices constituting the proximity network is referred to as a cluster. In the proximity service, electronic devices included in a cluster may transmit/receive a signal for discovery (e.g., a beacon) and a service discovery frame (SDF) to/from each other within a synchronized time duration or a communication interval (e.g., a discovery window (DW). For example, at least one electronic device in the cluster may transmit a signal to notify of the existence of the cluster to a new electronic device wishing to join the cluster, and may receive a response signal from the new electronic device wishing to join the cluster.

In order to perform NAN communication in an interval other than the DW, the electronic device may configure a NAN data path (NDP). For example, a time slot for data transmission in the interval between DWs may be defined even though a connection process between devices is omitted, thereby transmitting/receiving data in the time slot interval.

In the NAN communication, it is possible to perform data communication quickly and simply by operating on a connectionless basis, and to perform data communication flexibly with a plurality of devices.

If a Wi-Fi direct channel and a Wi-Fi channel are established differently from each other, Wi-Fi direct communication cannot be performed while the Wi-Fi channel is used because the Wi-Fi direct channel cannot be used during that time.

For example, if two or more electronic devices connected through a Wi-Fi Direct channel are using different Wi-Fi channels, it is possible to establish a Wi-Fi direct channel in the same manner as one Wi-Fi channel, thereby performing Wi-Fi direct communication. However, when other Wi-Fi channels are activated, Wi-Fi direct communication cannot be performed.

As such, there is a need in the art for method of scheduling a communication data link of an electronic device, to increase efficiency of NAN communication by enabling Wi-Fi direct communication to be more seamlessly performed.

SUMMARY

Aspects of the disclosure are to address at least the above-mentioned problems and/or disadvantages and to provide at least the advantages described below. Accordingly, an aspect of the disclosure is to provide an electronic device and a method of scheduling a communication data link of the electronic device, to increase efficiency of NAN communication.

Another aspect of the disclosure is to provide an electronic device and a method of scheduling a communication data link of the electronic device, which may identify a non-NAN connection state between an electronic device and an external electronic device to perform NAN communication, and may perform scheduling of a NAN data link, thereby increasing the transmission speed of NAN data communication and efficiently performing NAN communication and non-NAN communication.

In accordance with an aspect of the disclosure, an electronic device may include a communication module configured to support a first communication protocol and a second communication protocol, a processor operably connected to the communication module, and a memory operably connected to the processor, wherein the memory stores instructions that, when executed, enable the processor to establish a first connection based on the first communication protocol with a first external electronic device, identify a second external electronic device and a connection state of the second external electronic device using the second communication protocol, produce a first message, based at least in part on the first connection and the connection state of the second external electronic device, transmit the produced first message to the second external electronic device using the second communication protocol, receive, from the second external electronic device, a second message in response to the first message using the second communication protocol, and schedule, based at least in part on the received second message, a data link based on the second communication protocol.

In accordance with another aspect of the disclosure, an electronic device may include a communication module configured to support a first communication protocol and a second communication protocol, a processor operably connected to the communication module, and a memory operably connected to the processor, wherein the memory stores instructions that, when executed, enable the processor to establish a first connection based on the first communication protocol with a first external electronic device, produce a first message, based at least in part on the first connection, transmit the produced first message using the second communication protocol, receive, from a second external electronic device, a second message in response to the first message using the second communication protocol, and schedule, based at least in part on the received second message, a data link based on the second communication protocol.

In accordance with another aspect of the disclosure, a method of scheduling a communication data link of an electronic device may include establishing a first connection based on the first communication protocol with a first external electronic device identifying a second external electronic device and a connection state of the second external electronic device using the second communication protocol, producing a first message, based at least in part on the first connection and the connection state of the second external electronic device, transmitting the produced first message to the second external electronic device using the second communication protocol, receiving, from the second external electronic device, a second message in response to the first message using the second communication protocol, and scheduling, based at least in part on the received second message, a data link based on the second communication protocol.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
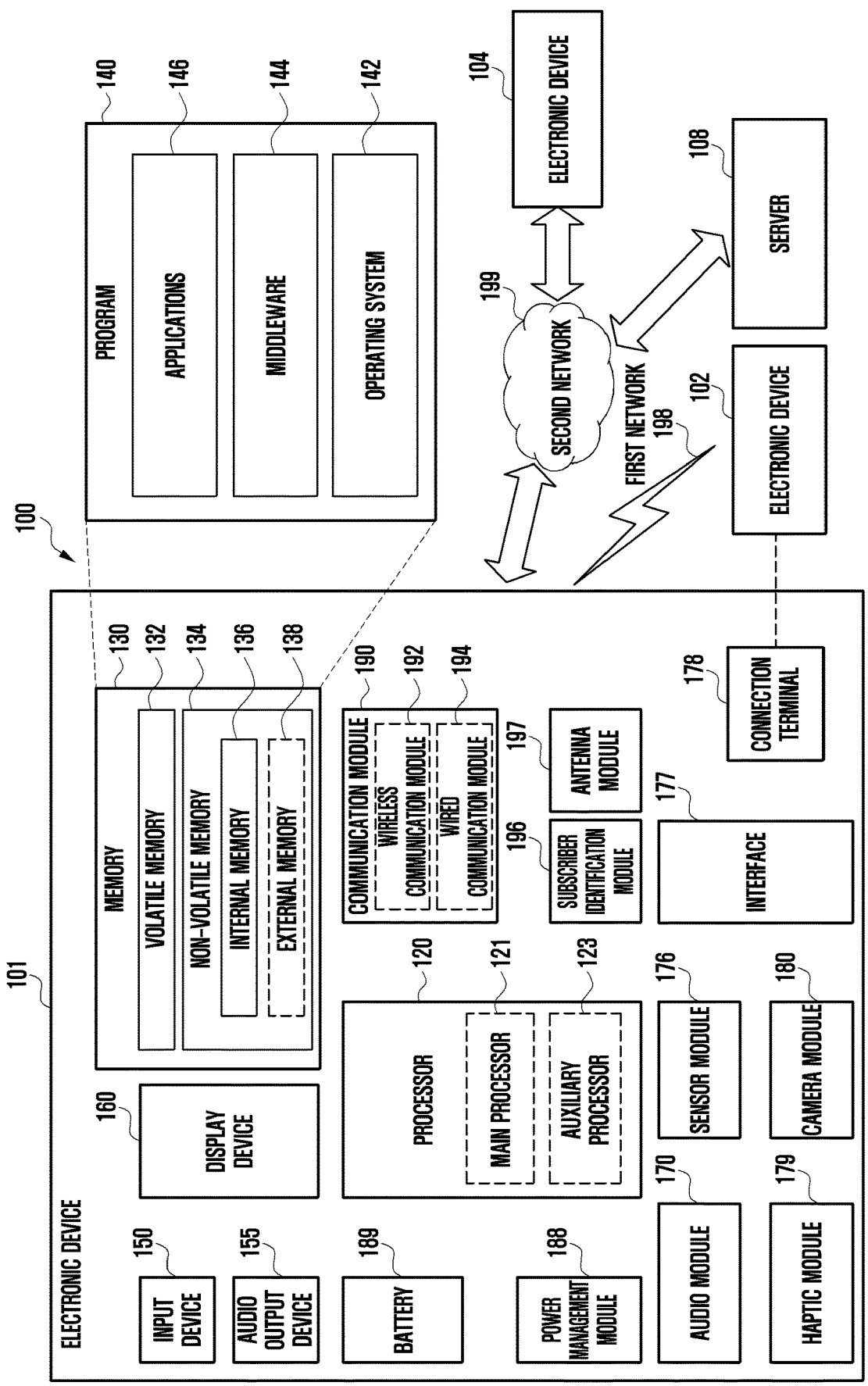
FIG. 1 illustrates an electronic device in a network environment according to an embodiment.

Hereinafter, various embodiments will be described with reference to the accompanying drawings. Descriptions of known functions and/or configurations will be omitted for the sake of clarity and conciseness.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. Herein, expressions such as "A or B", "at least one of A and B", "at least one of A or B", "A, B, or C", "at least one of A, B, and C", and "at least one of A, B, or C" should be interpreted as including any one of the listed items or as including any possible combination thereof As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," or "connected with," another element (e.g., a second element), this indicates that the first element may be coupled with the second element directly (e.g., wiredly), wirelessly, or via a third element.

FIG. 1 illustrates an electronic device 101 in a network environment 100 according to an embodiment. Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108.

The electronic device 101 may include a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134.

The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. The auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 (e.g., an ISP or a CP) may be implemented as part of another component (e.g., the camera module 180 or the communication module 190) functionally related to the auxiliary processor 123.

The memory 130 may store various data used by at least one component of the electronic device 101. The various data may include software and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other component of the electronic device 101, from a user of the electronic device 101. The input device 150 may include a microphone, a mouse, a keyboard, or a digital or stylus pen.

The sound output device 155 may output sound signals to the outside of the electronic device 101, and may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the user of the electronic device 101. The display device 160 may include a display, a hologram device, or a projector and control circuitry to control a corresponding one of the display, hologram device, and projector, as well as touch circuitry adapted to detect a touch, or sensor circuitry (e.g., a pressure sensor) adapted to measure the intensity of force incurred by the touch.

The audio module 170 may convert a sound into an electrical signal and vice versa, may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images, and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101 and may include a non-rechargeable primary cell, a rechargeable secondary cell, or a fuel cell.

The communication module 190 may support establishing a wired communication channel or a wireless communication channel between the electronic device 101 and the external electronic device 102, 104, or the server 108, and performing communication via the established communication channel The communication module 190 may include one or more communication processors that are operable independently from the processor 120 (e.g., the AP) and supports a wired communication or a wireless communication.

The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected by the communication module 190 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

Figure 2:
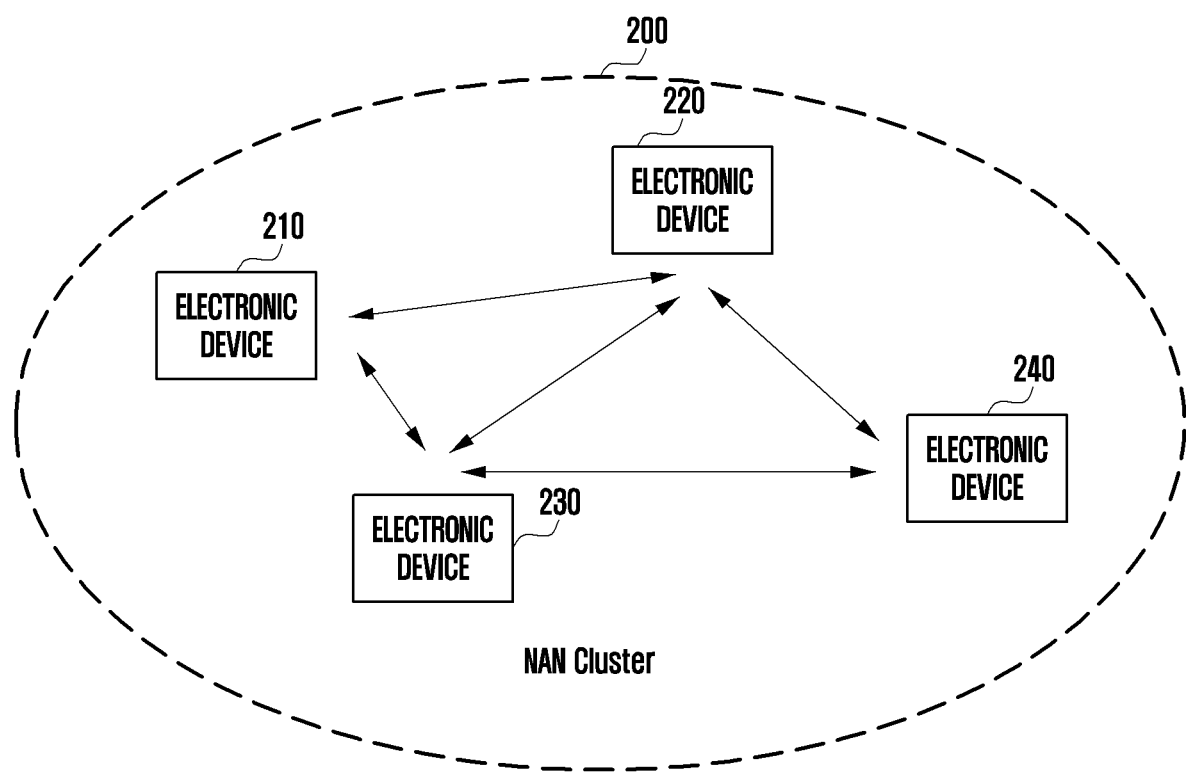
FIG. 2 illustrates an example of a system configuration according to an embodiment.

FIG. 2 illustrates an example of a system configuration according to an embodiment.

Specifically, FIG. 2 illustrates an example of the configuration of a NAN cluster 200 for a proximity network. In the following description, the cluster 200 may denote a set of electronic devices (or NAN devices) 210, 220, 230, and 240 that configure a proximity network such that the respective electronic devices 210, 220, 230, and 240 are able to transmit and receive data to and from each other. For example, the cluster 200 may be referred to as a NAN cluster according to the NAN specification (or standard).

Referring to FIG. 2, the cluster 200 may include a plurality of electronic devices 210, 220, 230, and 240. The electronic devices 210, 220, 230, and 240 included in the cluster 200 may transmit/receive a beacon (or a discovery beacon), an SDF, or a NAN action frame (NAF) within a synchronized time duration or a communication interval, such as a search DW. For example, the electronic devices 210, 220, 230, and 240 in the cluster 200 may be synchronized in the time clock with each other, and may exchange beacons, SDFs, or NAFs with each other in the same DW. An electronic device supporting a NAN-based low-power short-range communication technology may broadcast discovery signals (e.g., beacons) for discovering another electronic device in a predetermined first cycle (e.g., about 100 milliseconds (msec)), and may perform scanning in a predetermined second cycle (e.g., about 10 msec), thereby receiving a discovery signal broadcast from another electronic device. The electronic device may recognize at least one of other electronic devices located near the electronic device, based on the discovery signal received through scanning, and may perform time and channel synchronization with the at least one recognized electronic device.

As illustrated in FIG. 2, respective electronic devices 210, 220, 230, and 240 may transmit beacons, and may receive beacons from other electronic devices 210, 220, 230, and 240, thereby configuring one cluster 200, and the electronic devices 210, 220, 230, and 240 in the cluster 200 may perform time and channel synchronization.

Time and channel synchronization may be performed based on the time and channel of the electronic device having the highest master preference in the cluster 200. For example, the electronic devices 210, 220, 230, and 240 in the cluster 200 configured through discovery may exchange signals regarding master preference information indicating preference for operating as an anchor master, and the electronic device having the highest master preference may be determined to be an anchor master (or a master device) through the exchanged signals.

The anchor master may denote an electronic device that is a reference for time and channel synchronization of the electronic devices 210, 220, 230, and 240 in the cluster 200. The anchor master may differ according to the master preference of the electronic device. Each of the time- and channel-synchronized electronic devices 210, 220, 230, and 240 may transmit a beacon and an SDF and receive a beacon and an SDF from other electronic devices in the cluster 200 within a DW (or discovery interval) repeated in a predetermined cycle.

The beacon may be periodically transmitted and received every DW in order to continue to maintain time and channel synchronization of the electronic devices 210, 220, 230, and 240 in the cluster 200.

The SDF may be transmitted and received in the DW as necessary in order to provide services to the discovered electronic devices 210, 220, 230, and 240. The electronic device operating as an anchor master, among the time- and channel-synchronized electronic devices 210, 220, 230, and 240, may transmit a beacon to detect a new electronic device in an interval between the DWs.

Each of the time- and channel-synchronized electronic devices 210, 220, 230, and 240 may transmit a NAF and receive an NAF from other electronic devices in the cluster 200 within a DW (or a discovery interval) repeated in a predetermined cycle. The NAF may include one piece of information related to configuration of an NDP, information related to schedule update, or information related to NAN ranging so as to perform data communication in the interval between DWs. For example, the NAF may control a schedule of radio resources for coexistence of NAN operations and non-NAN operations (e.g., Wi-Fi direct, mesh, independent basic service set (IBSS), WLAN, Bluetooth™, or near-field communication (NFC)). The NAF may include time and channel information available for NAN communication.

Each of the electronic devices 210, 220, 230, and 240 in the cluster 200 may operate in an active state only during the DWs, and may operate in a low-power state (e.g., a sleep state) during the remaining intervals other than the DWs, thereby reducing power consumption. For example, the DW may be a period of time (e g , milliseconds) during which the electronic device is in an active state (or a wake-up state) in which a large amount of power is consumed, while the electronic device remains in a sleep state in an interval other than the DW, thereby enabling low-power discovery. Accordingly, the electronic devices 210, 220, 230, and 240 in the cluster 200 may be simultaneously activated at the start time (e.g., a DW start), which is time-synchronized, and may simultaneously switch to the sleep state at the end time of the DW.

The respective electronic devices 210, 220, 230, and 240 in the cluster 200 may exchange messages in other intervals, as well as in the DWs. For example, the electronic devices 210, 220, 230, and 240 in the cluster 200 may perform additional communication by configuring an active time slot in the interval between the DWs. The electronic devices may transmit and receive, in an active time slot, the SDF that the electronic devices failed to transmit and receive within the DW, and may specify a NAN communication operation interval and/or a non-NAN communication operation interval, thereby performing a NAN communication connection and/or a non-NAN communication connection.

The electronic devices 210, 220, 230, and 240 included in the cluster 200 may perform discovery, synchronization, and data exchange operations using the protocol illustrated in FIG. 3, which will now be described.

Figure 3:
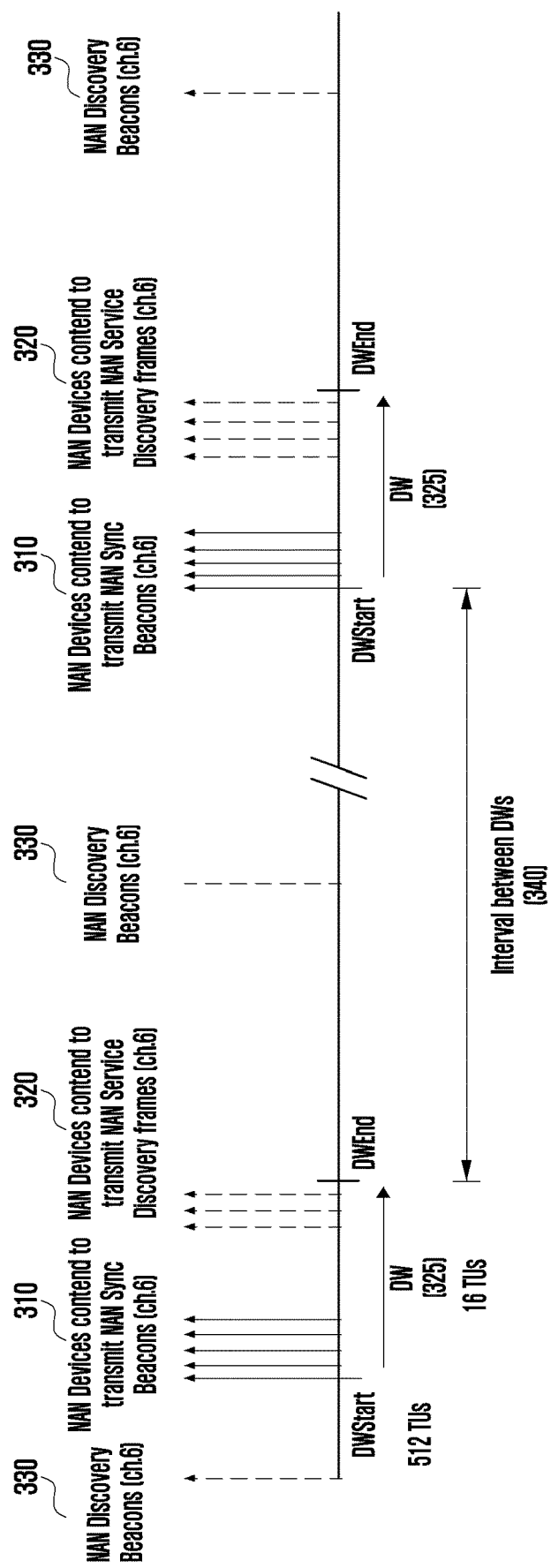
FIG. 3 illustrates an example of a signal transmission protocol in a proximity network according to an embodiment.

FIG. 3 illustrates an example of a signal transmission protocol in a proximity network according to an embodiment.

For example, FIG. 3 may illustrate an example of a DW. An example in which electronic devices included in a single cluster transmit signals through a specific channel (e.g., channel 6 (Ch6)), based on the NAN standard, will be described with reference to FIG. 3.

Referring to FIG. 3, electronic devices included in one cluster may transmit synchronization beacons 310 and SDFs 320 in a synchronized DW 325. Discovery beacons 330 may be transmitted by at least one electronic device in an interval 340 other than the DWs 325 (e.g., an interval between the DWs). The electronic devices may transmit the synchronization beacons 310 and the SDFs 320 on a contention basis. For example, the synchronization beacons 310 and the SDFs 320 may be transmitted based on contention between the electronic devices included in the cluster. Each of the electronic devices included in the cluster may have a transmission priority of the beacon 310 higher than that of the SDF 320.

Electronic devices included in a single cluster may transmit and receive NAFs in the synchronized DWs 325. The NAF may include one piece of information related to configuration of an NDP, information related to schedule update, or information related to NAN ranging so as to perform data communication in the interval between the DWs.

The DW 325 may be an interval in which a corresponding electronic device is activated by switching from a sleep state, which corresponds to a power saving mode, to a wake-up state in order for the electronic devices to exchange data with each other. For example, the DW 325 may be divided into time units (TUs) in milliseconds. The DW 325 for transmitting and receiving the synchronization beacons 310 and the SDFs 320 may occupy 16 TUs, and may have a cycle (or period) that is repeated every 512 TUs.

The discovery beacon 330 may be a signal transmitted to allow another electronic device that failed to join the cluster to discover the cluster. For example, the discovery beacon 330 is a signal to notify of the existence of the cluster, and the electronic devices that did not join the cluster may perform a passive scan to receive the discovery beacon 330, thereby discovering and joining the cluster.

The discovery beacon 330 may include information necessary for synchronization with the cluster, such as at least one of a frame control (FC) field indicating a function of a signal (e.g., a beacon), a broadcast address, a media access control (MAC) address of a transmission electronic device, a cluster identifier (ID), a sequence control field, a time stamp for a beacon frame, a beacon interval indicating the transmission interval of the discovery beacon 330, or capability information on a transmission electronic device. The discovery beacon 330 may include at least one proximity network (or cluster)-related information element, which is referred to herein as "attribute information".

The synchronization beacon 310 may indicate a signal for maintaining synchronization between the synchronized electronic devices in the cluster. The synchronization beacon 310 may be transmitted by a synchronization device among the electronic devices in the cluster. For example, the synchronization device may include an anchor master device, a master device, or a non-master synchronization device, which is defined in the NAN standard.

The synchronization beacon 310 may include information necessary for synchronization of the electronic devices in the cluster. For example, the synchronization beacon 310 may include at least one of an FC field indicating a function of a signal (e.g., a beacon), a broadcast address, a MAC address of a transmission electronic device, a cluster identifier, a sequence control field, a time stamp for a beacon frame, a beacon interval indicating the interval between start points of the DWs 325, or capability information on a transmission electronic device. The synchronization beacon 310 may include at least one proximity network (or cluster)-related information element, such as contents for services provided through the proximity network.

The SDF 320 may denote a signal for exchanging data through a proximity network. The SDF 320 may represent a vendor-specific public action frame, and may include various fields. For example, the SDF 320 may include a category or an action field, and may include at least one piece of proximity network-related information.

As described above, the synchronization beacon 310, the SDF 320, and the discovery beacon 330 may include proximity network-related information such as an identifier indicating the type of information, a length of information, and a body field, which is corresponding information. The corresponding information may include at least one piece of master indication information, cluster information, service identifier list information, service descriptor information, connection capability information, an extended WLAN infrastructure attribute, and peer-to-peer (P2P) operation information, IBSS information, mesh information, additional proximity network service discovery information, further availability map information, country code information, ranging information, cluster discovery information, or vendor-specific information.

Figure 4:
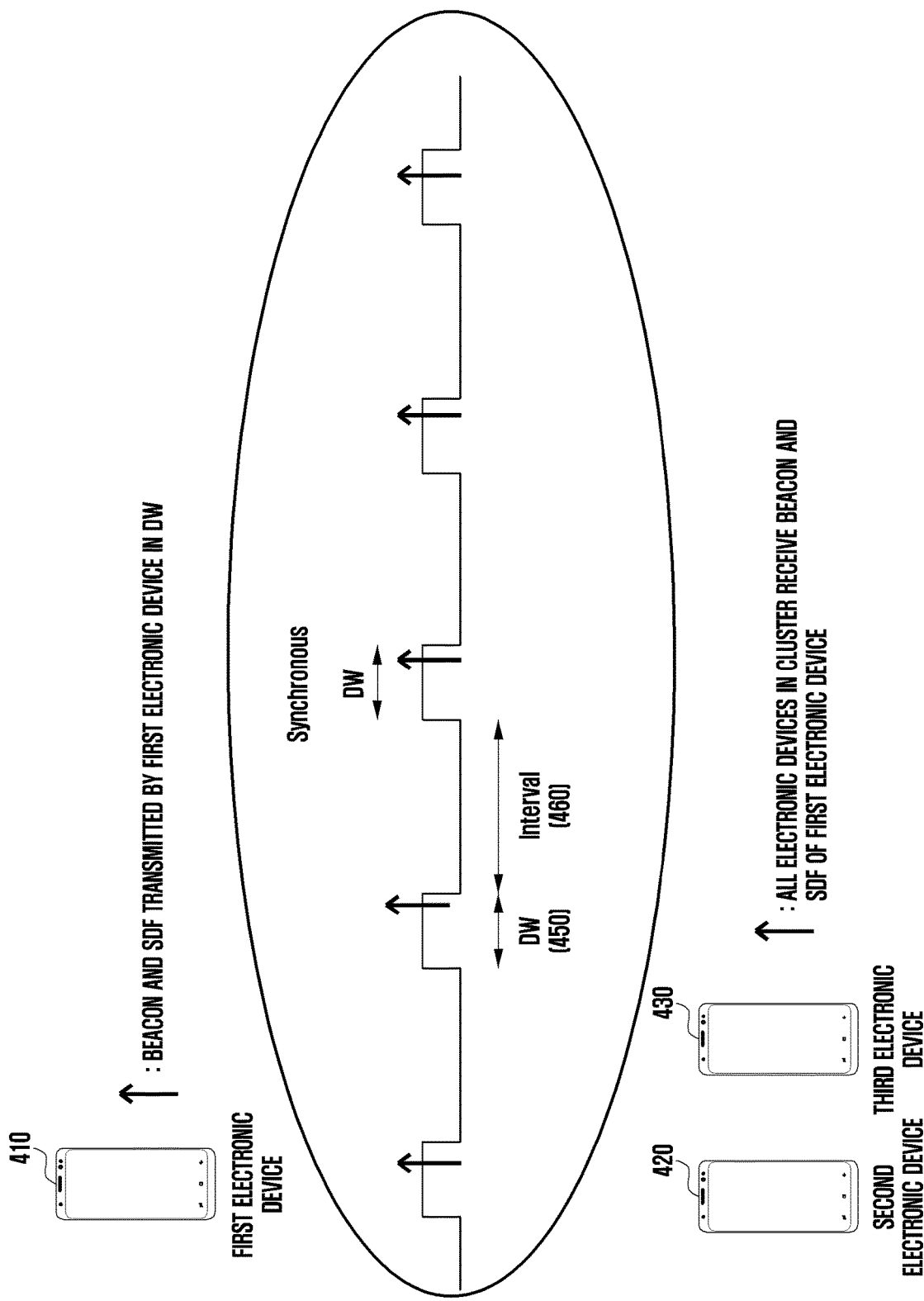
FIG. 4 illustrates an example of data transmission/reception in a cluster according to an embodiment.

FIG. 4 illustrates an example of data transmission and reception in a cluster according to an embodiment.

For example, FIG. 4 illustrates an example in which a first electronic device 410, a second electronic device 420, and a third electronic device 430 configure one cluster through a wireless short-range communication technology, and the respective electronic devices 410, 420, and 430 may transmit and receive beacons, SDFs, and/or NAFs to and from each other. In FIG. 4, the first electronic device 410, among the electronic devices 410, 420, and 430 constituting the cluster, may serve as a master electronic device.

Referring to FIG. 4, the first electronic device 410 may transmit beacons, SDFs, or NAFs in the DW 450, and may broadcast beacons, SDFs, or NAFs every DW 450 repeated every predetermined interval 460.

The second electronic device 420 and the third electronic device 430 may receive beacons, SDFs, or NAFs transmitted by the first electronic device 410 every DW 450.

The beacon transmitted in the DW 450 may indicate a synchronization beacon, and may include information for maintaining synchronization between the electronic devices 410, 420, and 430. For example, if the electronic devices 410, 420, and 430 are included in a cluster, a time clock is synchronized with a master electronic device 410, so that the DW 450 may be simultaneously activated.

The electronic devices 410, 420, and 430 may remain in a sleep state in intervals 460 other than the DWs 450 in order to reduce power consumption. For example, the electronic devices 410, 420, and 430 may operate in a wake-up state only in the DWs 450, based on the synchronized time clock, thereby reducing power consumption.

The electronic devices 410, 420, and 430 may configure an active time slot in intervals 460 other than the DWs 450, thereby performing additional communication. For example, the electronic devices may transmit and receive an SDF, which was not transmitted/received in the DW, in the active time slot, or may specify an operation for a Wi-Fi Direct, mesh, IBSS, WLAN, Bluetooth™, or NFC connection during the active time slot, thereby performing a legacy Wi-Fi connection or a discovery operation.

Figure 5:
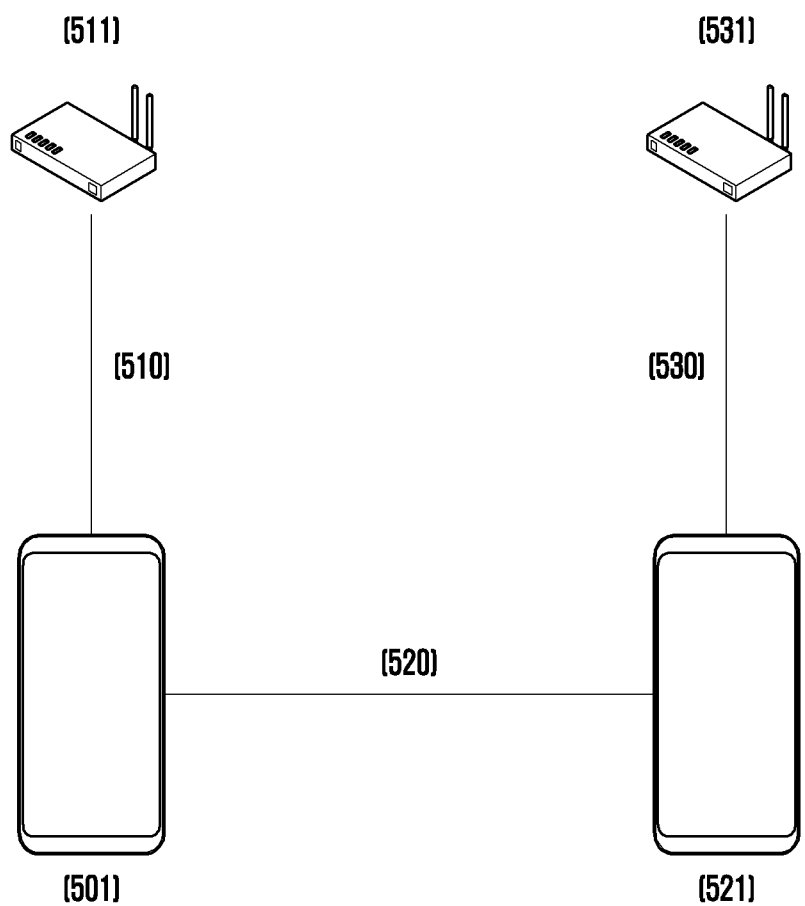
FIG. 5 illustrates an example of a first system according to an embodiment.

FIG. 5 illustrates an example of a system according to an embodiment.

Referring to FIG. 5, an electronic device 501 may establish a first connection 510 based on a first communication protocol (e.g., Wi-Fi) with a first external electronic device 511. For example, the electronic device 501 and the first external electronic device 511 may negotiate a channel for communication (e.g., channel 36), and may establish a first connection 510 using the negotiated channel, thereby transmitting and receiving data.

A second external electronic device 521 capable of configuring a NAN cluster with the electronic device 501 may establish a third connection 530 based on a third communication protocol (e.g., Wi-Fi or Wi-Fi Direct) with a third external electronic device 531. The second external electronic device 521 may establish a third connection 530 using a channel (e.g., channel 149) negotiated with the third external electronic device 531, thereby transmitting and receiving data.

The electronic device 501 may identify the second external electronic device 521 using the second communication protocol (e.g., NAN). For example, the electronic device 501 may transmit and receive a beacon, an SDF, or an NAF within a synchronized time duration (e.g., a DW), thereby identifying the second external electronic device 521. The electronic device 501 may identify at least one of a NAN availability attribute, an extended WLAN infrastructure attribute, or an unaligned schedule attribute using at least one of a beacon, an SDF, or an NAF transmitted from the second external electronic device 521. For example, the electronic device 501 may identify information related to the third connection 530 of the second external electronic device 521, based on at least one of a NAN availability attribute, an extended WLAN infrastructure attribute, or an unaligned schedule attribute.

The electronic device 501 may schedule a data path based on the second communication protocol in consideration of information related to the first connection 510 and information related to the third connection 530. For example, the electronic device may configure at least one further available window (FAW) in the interval between synchronized time durations, and may perform data communication.

The electronic device 501 may use channel information on the third connection 530 in order to establish a second connection 520 with the second external electronic device 521. For example, the electronic device 501 may communicate with the second external electronic device 521 using channel information (e.g., channel 149) on the third connection 530. In this case, the electronic device 501 may switch between a first channel (e.g., channel 36) for the first connection 510 and a second channel (e.g., channel 149) for the second connection 520, thereby maintaining both connections. For example, both connections may be maintained by allocating 50% of the radio resources to each of the first and second channels. In this case, the electronic device and the second external electronic device 521 may perform data communication with an efficiency of up to about 50%.

The electronic device 501 may improve data communication efficiency with the second external electronic device 521. For example, the electronic device 501 and the second external electronic device 521 may simultaneously switch between channels, thereby performing continuous data communication.

An electronic device 501 as described above may include a communication module configured to support a first communication protocol and a second communication protocol, a processor operably connected to the communication module, and a memory operably connected to the processor, wherein the memory may store instructions that, when executed, allow (or enable) the processor to establish a first connection 510 based on the first communication protocol with a first external electronic device 521, identify a second external electronic device 521 and a connection state of the second external electronic device 521 using the second communication protocol, produce a first message, based at least in part on the first connection 510 and the connection state of the second external electronic device 521, transmit the produced first message to the second external electronic device 501 using the second communication protocol, receive, from the second external electronic device 521, a second message in response to the first message using the second communication protocol, and based at least in part on the received second message, schedule a data link based on the second communication protocol.

The first communication protocol may support a communication operation other than a NAN communication operation, and the second protocol may support the NAN communication operation.

The first message or the second message may be included in at least one of a beacon, an SDF, or an NAF, which is transmitted within a synchronized time duration.

The first message or the second message may include one of a NAN availability attribute, an extended WLAN infrastructure attribute, or an unaligned schedule attribute.

The instructions may allow the processor to determine at least one FAW included in an interval between the synchronized time durations and include the at least one determined FAW in the first message, thereby proposing a schedule.

The first message may include at least one of channel information, band information, a start offset, a bit duration, or a period, which is related to the at least one determined FAW.

The second message may be configured as a schedule response including one of "acceptance", "refusal", or "modification proposal" with respect to the proposed schedule.

The connection state of the second external electronic device 521 may include information related to a third connection 530 based on a third communication protocol, which is established between the second external electronic device 521 and the third external electronic device 531.

According to an embodiment, an electronic device may include a communication module configured to support a first communication protocol and a second communication protocol, a processor operably connected to the communication module; and a memory operably connected to the processor, wherein the memory may store instructions that, when executed, allow the processor to establish a first connection based on the first communication protocol with a first external electronic device, produce a first message, based at least in part on the first connection information, transmit the produced first message using the second communication protocol, receive, from the second external electronic device, a second message in response to the first message using the second communication protocol, and based at least in part on the received second message, schedule a data link based on the second communication protocol.

The first communication protocol may support a communication operation other than a NAN communication operation, and the second protocol may support the NAN communication operation.

The first message or the second message may be included in at least one of a beacon, an SDF), or an NAF, which is transmitted within a synchronized time duration.

The first message or the second message may include one of a NAN availability attribute, an extended WLAN infrastructure attribute, or an unaligned schedule attribute.

The instructions may allow the processor to determine at least one FAW included in an interval between the synchronized time durations and include the at least one determined FAW in the first message, thereby proposing a schedule.

The first message may include at least one of channel information, band information, a start offset, a bit duration, or a period, which is related to the at least one determined FAW.

The second message may be configured as a schedule response including one of "acceptance", "refusal", or "modification proposal" with respect to the proposed schedule.

The second message may include information related to a third connection based on a third communication protocol, which is established between the second external electronic device and the third external electronic device.

Figure 6:
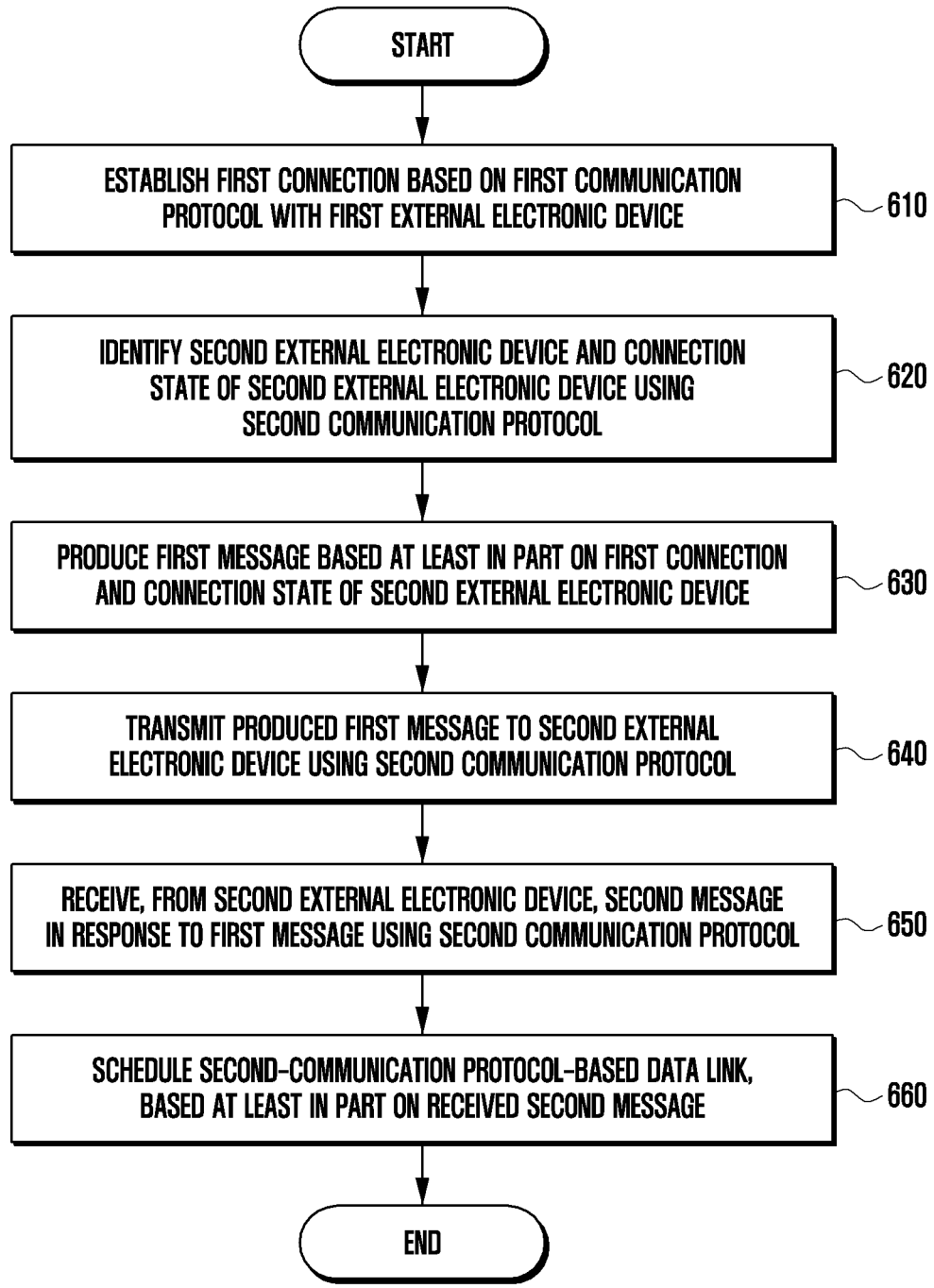
FIG. 6 illustrates a scheduling method of a communication data link in a first system according to an embodiment.

FIG. 6 illustrates a scheduling method of a communication data link in a system according to an embodiment. The electronic device 501 may perform the operations described with reference to FIG. 6 in the system shown in FIG. 5.

Referring to FIG. 6, in step 610, the electronic device 501 may establish a first connection 510 based on a first communication protocol with a first external electronic device 511. The first communication protocol may support non-NAN communication operation. Herein, non-NAN communication may indicate various communication manners other than NAN communication, such as at least one of Wi-Fi Direct, mesh, IBSS, WLAN, Bluetooth™, or NFC. A non-NAN communication may support at least one standard of IEEE 802.11a, IEEE 802.11g, IEEE 802.11n, or IEEE 802.11ac. For example, the first communication protocol used for the first connection 510 may support a communication connection having a carrier frequency in a 2.4 gigahertz (GHz) band or a 5.0 GHz band.

In step 620, the electronic device 501 may identify a second external electronic device 521 and a connection state of the second external electronic device 521 using the second communication protocol. The second communication protocol may support a NAN communication operation according to the NAN standard. The electronic device 501 may exchange beacons, SDFs, or NAFs with the second external electronic device 521 within a synchronized time duration (e.g., a DW), thereby identifying the second external electronic device 521.

The electronic device 501 may broadcast discovery signals (e.g., beacons) for discovering another electronic device in a predetermined first cycle (e.g., about 100 msec), and may perform scanning in a predetermined second cycle (e.g., about 10 msec), thereby receiving a discovery signal broadcast from another electronic device. For example, based on the discovery signal received through scanning, the electronic device 501 may identify the second external electronic device 521 located near the electronic device, and may perform time and channel synchronization.

The electronic device 501 may identify a connection state of the second external electronic device 521. For example, a beacon, an SDF, or an NAF received from the second external electronic device 521 may include at least one of a NAN availability attribute, an extended WLAN infrastructure attribute, or an unaligned schedule attribute. The electronic device 501 may identify the non-NAN communication-based connection state of the second external electronic device 521, based on at least one of the received NAN availability attribute, an extended WLAN infrastructure attribute, and an unaligned schedule attribute. For example, the extended WLAN infrastructure attribute may include a non-NAN operation channel information field. The electronic device 501 may refer to the non-NAN operation channel information field in the extended WLAN infrastructure attribute, and may identify channel information (e.g., Wi-Fi channel information) being used by the second external electronic device 521.

In step 630, the electronic device 501 may produce a first message, based at least in part on the first connection 510 and the connection state of the second external electronic device 521. For example, if the second external electronic device 521 is in a third connection 530 based on the third communication protocol with a third external electronic device 531, the electronic device 501 may produce a first message, based at least in part on the first connection 510 and the third connection 530. As another example, if the second external electronic device 521 is not in a non-NAN communication-based connection, the electronic device 501 may produce a first message, based at least in part on the first connection 510.

The first message may be configured in the form of a NAN availability attribute and/or an unaligned schedule attribute. The electronic device 501 may include a data link schedule proposal (e.g., a schedule request) based on the second communication protocol in the NAN availability attribute and/or the unaligned schedule attribute. The schedule proposal may be included in the NAN availability attribute, the unaligned schedule attribute, or a combination of the NAN availability attribute and the unaligned schedule attribute. If the NAN availability attribute and the unaligned schedule attribute overlap each other, the unaligned schedule attribute may have priority.

In step 640, the electronic device 501 may transmit the produced first message to the second external electronic device 521 using the second communication protocol. The first message may be included in at least one of a beacon, an SDF, or an NAF to then be transmitted to the second external electronic device 521.

In step 650, the electronic device may receive, from the second external electronic device 521, a second message in response to the first message using the second communication protocol.

If the first message includes a data link schedule proposal based on the second communication protocol, the second message may be configured as a schedule response including one of "acceptance", "refusal", or "modification proposal". For example, if the second message received from the second external electronic device 521 includes "acceptance", the data link based on the second communication protocol may be scheduled as an initial proposal of the electronic device 501. If the second message received from the second external electronic device 521 includes "refusal", the electronic device 501 may give up scheduling of the data link based on the second communication protocol. If the second message received from the second external electronic device 521 includes "modification proposal", the electronic device 501 may transmit, to the second external electronic device 521, a third message including one of "acceptance", "refusal", or "modification proposal".

In step 660, based at least in part on the second message received from the second external electronic device 521, the electronic device 501 may schedule the data link based on the second communication protocol. For example, the electronic device 501 may perform second-communication protocol-based data communication, based on the schedule negotiated with the second external electronic devices 521.

According to an embodiment, a method of scheduling a communication data link of an electronic device may include establishing a first connection based on the first communication protocol with a first external electronic device, identifying a second external electronic device and a connection state of the second external electronic device using the second communication protocol, producing a first message, based at least in part on the first connection and the connection state of the second external electronic device, transmitting the produced first message to the second external electronic device using the second communication protocol, receiving, from the second external electronic device, a second message in response to the first message using the second communication protocol, and based at least in part on the received second message, scheduling a data link based on the second communication protocol.

The first communication protocol may support a communication operation other than a NAN communication operation, and the second protocol may support the NAN communication operation.

The first message or the second message may be included in at least one of a beacon, an SDF, or an NAF, which is transmitted within a synchronized time duration.

The first message or the second message may include one of a NAN availability attribute, an extended WLAN infrastructure attribute, or an unaligned schedule attribute.

Figure 7:
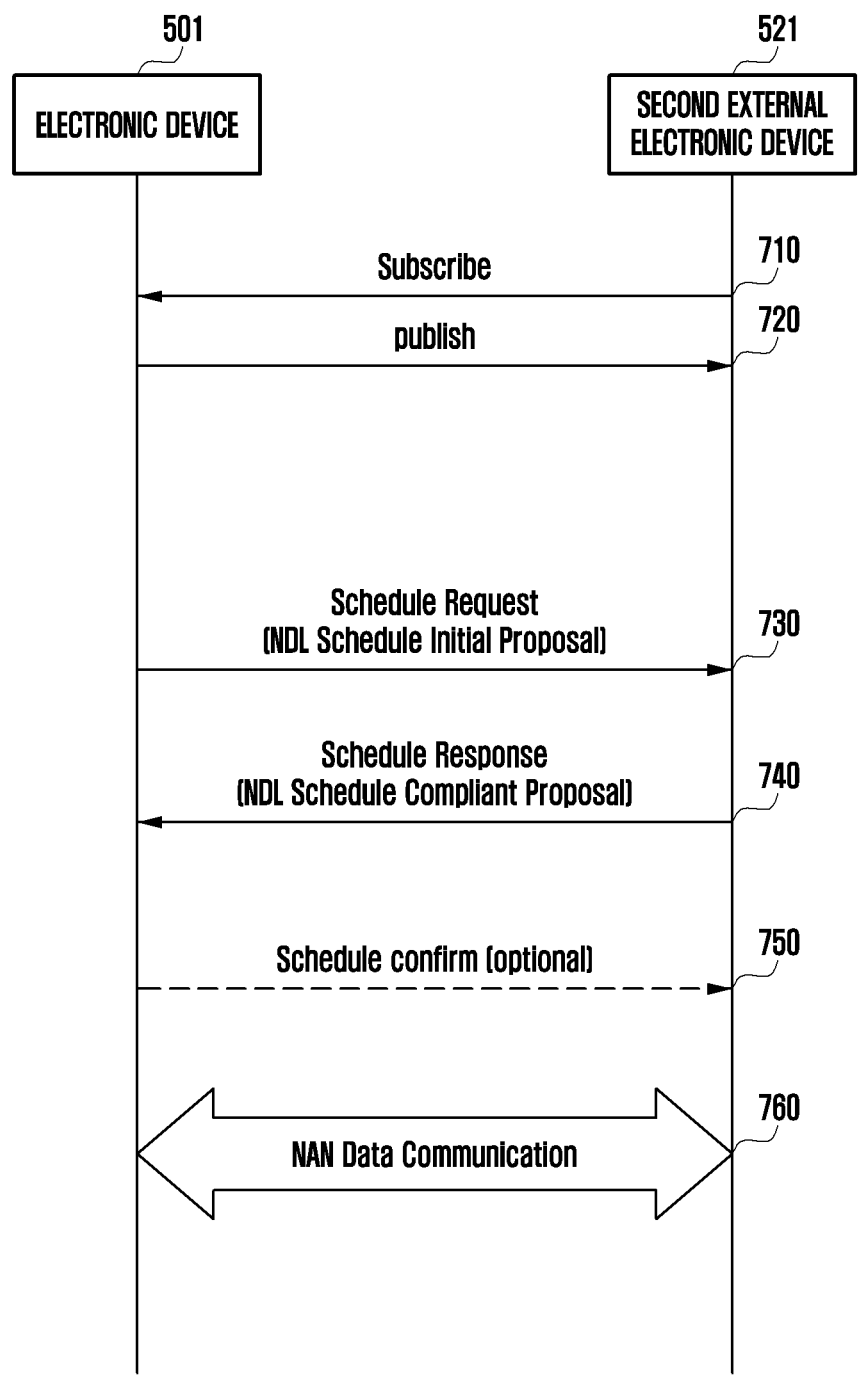
FIG. 7 illustrates a first method of scheduling a communication data link in a first system according to an embodiment.

FIG. 7 illustrates a method of scheduling a communication data link in a system according to an embodiment. The electronic device 501 may perform the operations described with reference to FIG. 7 in the system shown in FIG. 5.

Referring to FIG. 7, in step 710, the electronic device 501 may subscribe to a discovery signal (e.g., a beacon) transmitted from the second external electronic device 521. For example, if the second external electronic device 521 broadcasts or unicasts a discovery signal, the electronic device 501 may receive the broadcast or unicast discovery signal to subscribe to NAN service discovery. The discovery signal may include connection state information of the second external electronic device 521. The electronic device 501 may identify a connection state of the second external electronic device 521 (e.g., the third connection 530), based on the discovery signal received from the second external electronic device 521. For example, the electronic device 501 may identify Wi-Fi channel information (e.g., channel 149) of the third connection 530, based on the discovery signal received from the second external electronic device 521.

In step 720, the electronic device 501 may publish a discovery signal (e.g., a beacon) including its own connection state information. For example, the electronic device 501 may issue a beacon indicating the operation of a NAN service. The second external electronic device 521 may subscribe to a discovery signal issued from the electronic device 501, and may identify a connection state of the electronic device 501 (e.g., the first connection 510). The order of steps 710 and 720 may vary, or steps 710 and 720 may be performed simultaneously.

In step 730, the electronic device 501 may produce a first message, based at least in part on the first connection 510 and the connection state of the second external electronic device 521, and may transmit the same to the second external electronic device 521. The first message may be included in at least one of a beacon, an SDF, or an NAF to then be transmitted to the second external electronic device 521. The first message may be configured in the form of a NAN availability attribute and/or an unaligned schedule attribute. The electronic device 501 may include a data link schedule proposal (e.g., a schedule request) based on the second communication protocol in the NAN availability attribute and/or the unaligned schedule attribute.

In step 740, the electronic device 501 may receive, from the second external electronic device 521, a second message in response to the first message using the second communication protocol. The second message may be configured as a schedule response including one of "acceptance", "refusal", or "modification proposal".

In step 750, if the second message includes "acceptance" or "modification proposal", the electronic device 501 may transmit a schedule confirmation message in response to the second message using the second communication protocol. Based on the schedule confirmation message, the second electronic device 521 may identify that the schedule was determined. Transmission of the schedule confirmation message may optionally be performed. For example, the electronic device 501 may omit step 750.

In step 760, the electronic device 501 may schedule a second-communication protocol-based data link, based at least in part on the second message received from the second external electronic device 521, and may perform second-communication protocol-based (NAN) data communication with the second external electronic device 521.

Figure 8A:
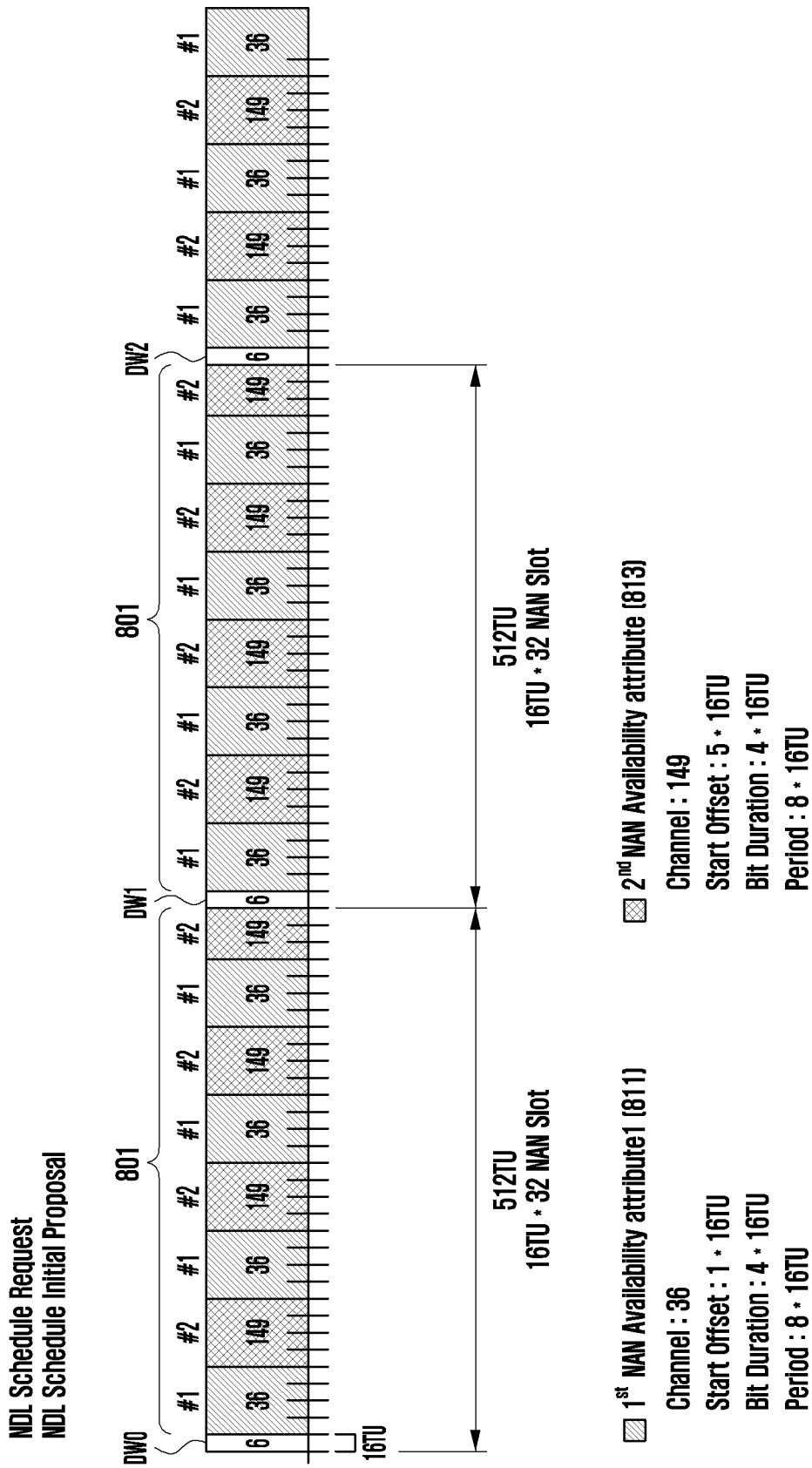
FIG. 8A illustrates a schedule proposal according to the first method illustrated in FIG. 7.

FIG. 8A illustrates a schedule proposal according to the embodiment illustrated in FIG. 7. The electronic device 501 may produce a schedule proposal shown in FIG. 8A as part of step 730 in FIG. 7.

Referring to FIG. 8A, a data link schedule proposal (e.g., a schedule request) based on the second communication protocol may be included in a first message configured in the form of a NAN availability attribute and/or an unaligned schedule attribute. In addition, the NAN availability attribute and/or the unaligned schedule attribute may be included in at least one of a beacon, an SDF, or an NAF.

The electronic device 501 may produce a data path schedule proposal based on the second communication protocol in consideration of information related to the first connection 510 and/or information related to the third connection 530. For example, the electronic device may configure at least one FAW in an interval 801 between synchronized time durations (e.g., DW0, DW1, or DW2), and may schedule a data path.

The FAW may be configured based on the NAN availability attribute. The FAW may be configured as a radio time resource unit having a length of 16 TUs according to the NAN standard. For example, a FAW (or a NAN slot) configured as a multiple of a length of 16TUs may be allocated to the interval 801 between the DWs (e.g., DW0, DW1, or DW2). The NAN availability attribute (e.g., a first NAN availability attribute 811 or a second NAN availability attribute 813 may include channel and band information and information related to one of a start offset, a bit duration, or a period, which are used for each FAW (e.g., NAN slot #1 or NAN slot #2).

The channel information may be used to specify an operating class and to configure a primary channel The band information may be used to configure a band (e.g., a 2.4 GHz band or a 5 GHz band) to perform NAN communication. The start offset may be used to indicate an offset between the start point of the FAW (or NAN slot) and the start point of the DW (e.g., DW0, DW1, or DW2). The bit duration may be used to indicate the duration time of the FAW (NAN slot). The period may be used to indicate a cycle in which the FAWs (or NAN slots) 801 repeat.

For example, a first NAN availability attribute 811 may produce a FAW (e.g., NAN slot #1) configured as channel 36, a start offset of 1*16 TUs, a bit duration of 4* 16 TUs, and a period of 8*16 TUs. As another example, a second NAN availability attribute 813 may produce a FAW (e.g., NAN slot #2) configured as channel 149, a start offset of 5*16 TUs, a bit duration of 4*16 TUs, and a period of 8*16 TUs. The first NAN availability attribute 811 and/or the second NAN availability attribute 813 may include band information on the respective FAWs.

Figure 8B:
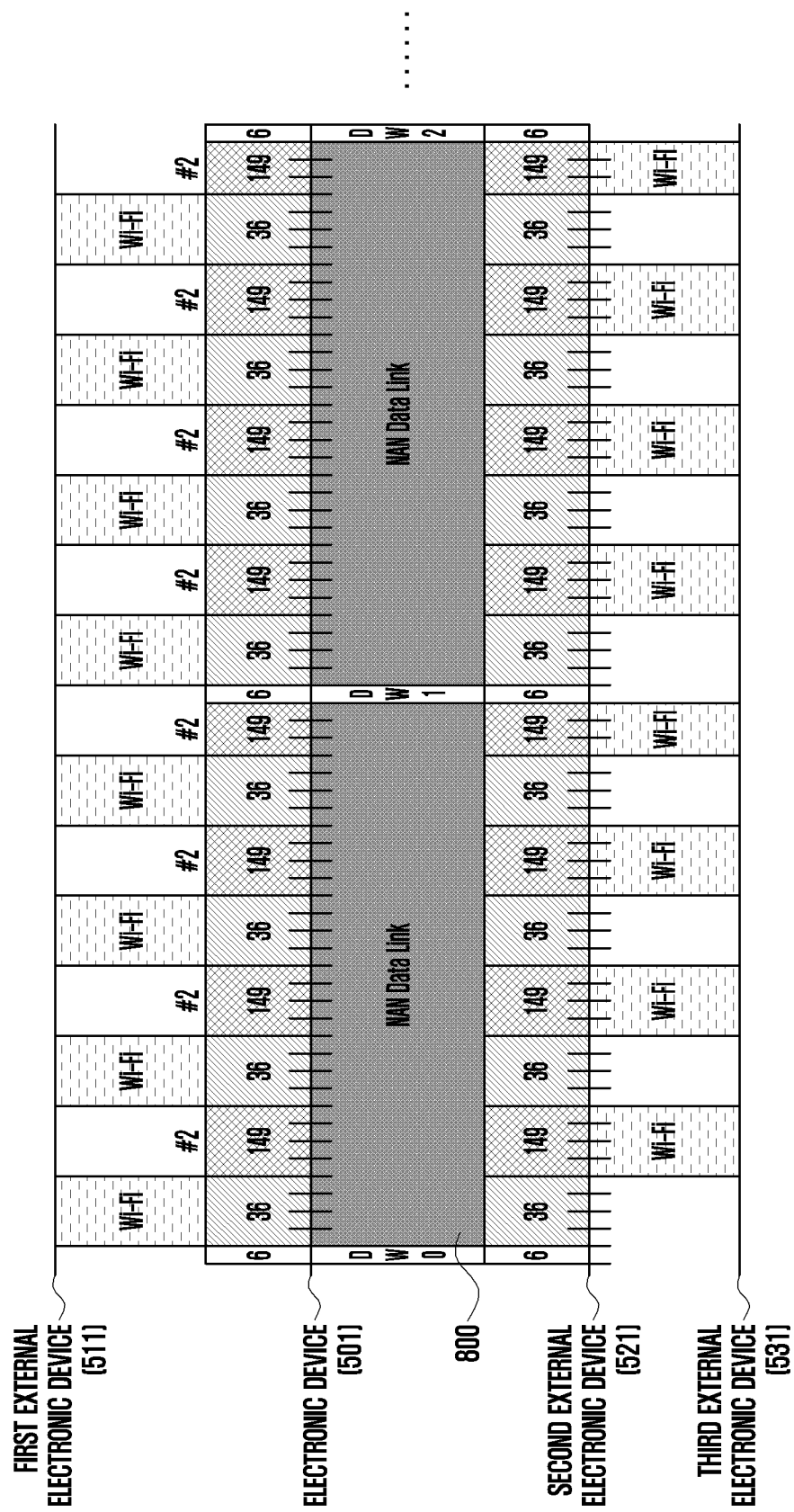
FIG. 8B illustrates an allocation range of a data link when the schedule proposal is accepted according to FIG. 8A.

FIG. 8B illustrates an allocation range of a data link when the schedule proposal according to FIG. 8A is accepted. If the electronic device 501 receives, from the second external device 521, a second message including "acceptance" in response to the first message, the electronic device 501 and the second external electronic device 521 may continue to perform data communication while performing channel switching (e.g., channel 36→channel 149) at the same time. For example, the second external device 521 may perform channel switching, based on the second-communication protocol-based data link schedule proposal (e.g., a schedule request), which is received from the electronic device 501.

If the second external device 521 is not able to comply with the schedule proposal received from the electronic device 501, the second external device 521 may transmit, to the electronic device 501, a second message including "refusal" or "modification proposal" in response to the first message. In this case, the electronic device 501 may transmit, to the second external electronic device 521, a third message including "acceptance", "refusal", or "modification proposal".

Embodiments herein may allow a plurality of devices to switch to the same channel simultaneously, thereby supporting endless and persistent NAN data communication 800.

Figure 9:
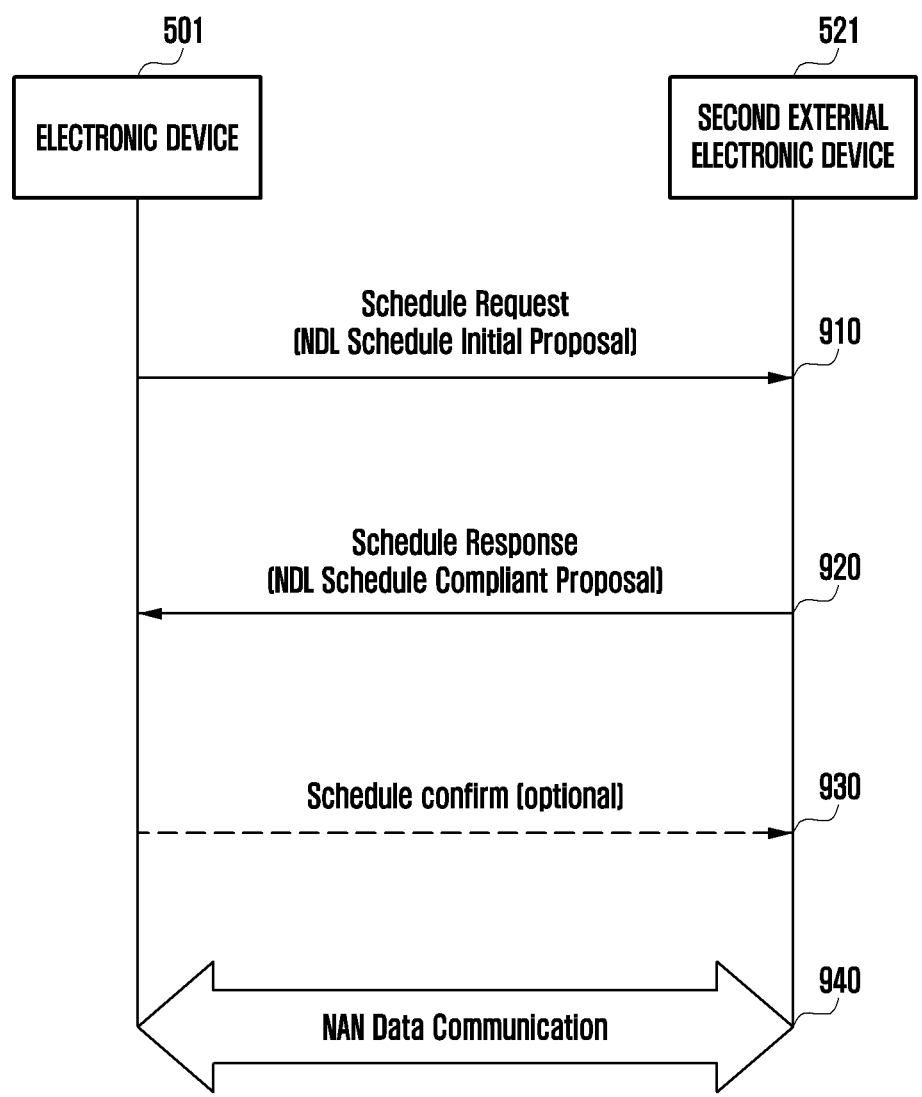
FIG. 9 illustrates a second method of scheduling a communication data link in a system according to an embodiment.

FIG. 9 illustrates a method of scheduling a communication data link in a system according to an embodiment. The electronic device 501 may perform the steps described with reference to FIG. 7 in the system shown in FIG. 5.

Referring to FIG. 9, in step 910, the electronic device 501 may transmit a beacon, an SDF, or an NAF including a schedule proposal (e.g., a schedule request) as a first message. For example, at least one of the beacon, the SDF, or the NAF may include a NAN availability attribute and/or an unaligned schedule attribute, and the NAN availability attribute and/or the unaligned schedule attribute may include a data link schedule proposal based on the second communication protocol. Since the electronic device 501 has no information on the third connection 530 of the second external electronic device 521, the electronic device 501 may produce a schedule proposal only in consideration of information on the first connection 510.

In step 920, the electronic device 501 may receive, from the second external electronic device 521, a second message in response to the first message using the second communication protocol. The second message may be configured as a schedule response including one of "acceptance", "refusal", or "modification proposal". The second external electronic device 521 may recognize the schedule intended by the electronic device 501, and may propose modification of the schedule according to the intention of the electronic device 501. For example, the second external electronic device 521 may recognize that the electronic device 501 has proposed scheduling without information on the third connection 530, and may produce a schedule modification proposal according to the third connection 530.

In step 930, if the second message includes "acceptance" or "modification proposal", the electronic device 501 may transmit a schedule confirmation message using the second communication protocol in response to the second message. For example, if the second message received from the second external electronic device 521 includes "acceptance", the electronic device may transmit a schedule confirmation message to schedule the data link based on the second communication protocol as initially suggested by the electronic device 501. If the second message received from the second external electronic device 521 includes "modification proposal", the electronic device 501 may transmit a schedule confirmation message indicating "acceptance". The second message may include one of "refusal" or "modification proposal", in which case the electronic device 501 may transmit a third message in response to the second message to the second external electronic device 521. The second electronic device 521 may identify that the schedule was determined based on the schedule confirmation message. Transmission of the schedule confirmation message may optionally be performed. For example, the electronic device 501 may omit step 930.

In step 940, the electronic device 501 may schedule a data link based on the second communication protocol, based at least in part on the second message received from the second external electronic device 521, and may perform second-communication protocol-based (NAN) data communication with the second external electronic device 521.

Figure 10A:
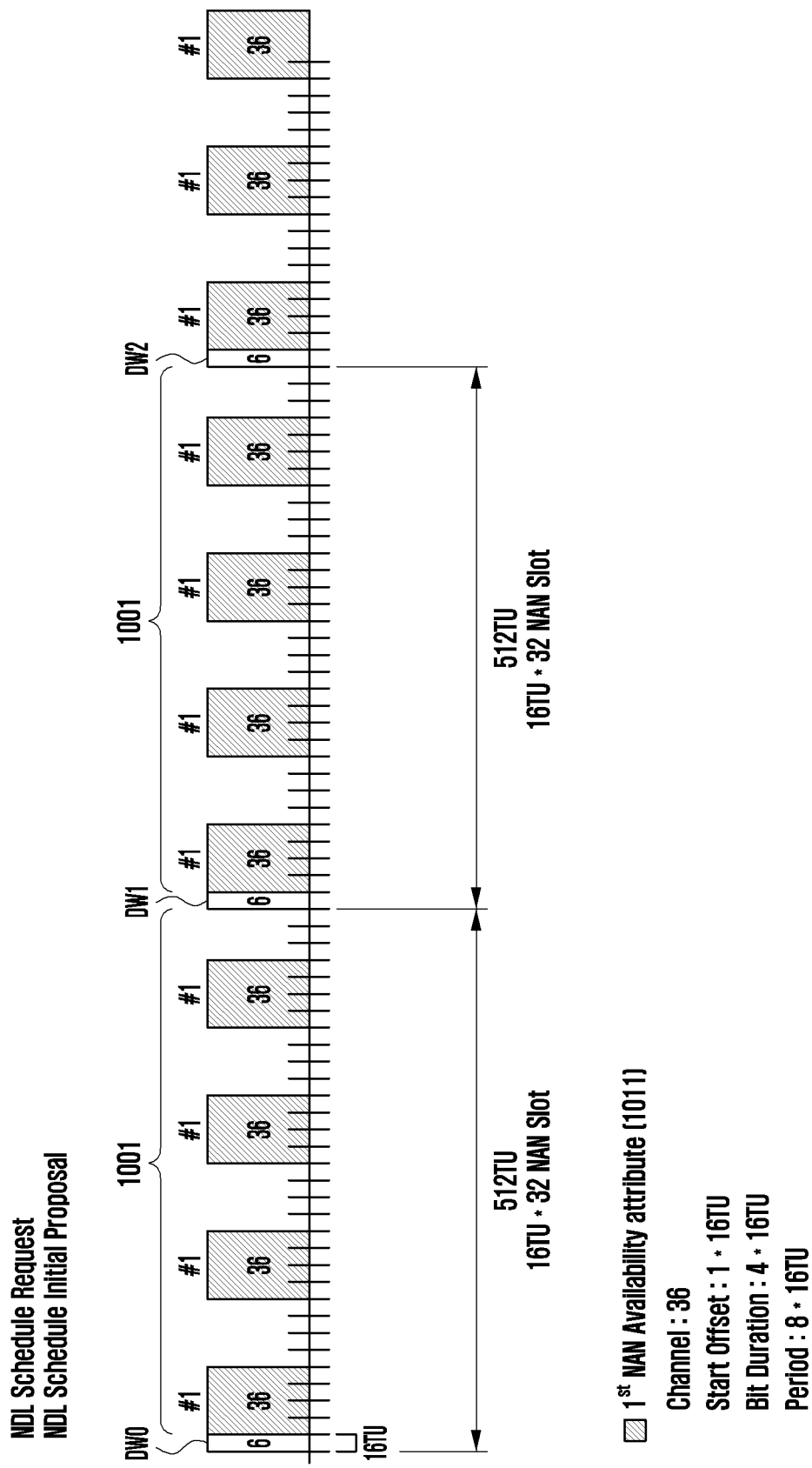
FIG. 10A illustrates a schedule proposal according to the second method illustrated in FIG. 9.

FIG. 10A illustrates a schedule proposal according to the method illustrated in FIG. 9. The electronic device 501 may produce the schedule proposal shown in FIG. 10A as a part of step 910 in FIG. 9.

A data link schedule proposal (e.g., a schedule request) based on the second communication protocol may be included in a NAN availability attribute and/or an unaligned schedule attribute. In addition, the NAN availability attribute and/or the unaligned schedule attribute may be included in at least one of a beacon, an SDF, or an NAF.

The electronic device 501 may schedule a data path based on the second communication protocol in consideration of information related to the first connection 510.

Referring to FIG. 10A, a first NAN availability attribute 1011 may be configured as channel 36, a start offset of 1*16 TUs, a bit duration of 4*16 TUs, and a period of 8*16 TUs. The electronic device 501 that failed to identify the connection state of the second electronic device 521 may configure an initial schedule proposal in various forms. For example, the schedule proposal shown in FIG. 8A or the schedule proposal shown in FIG. 13A may be produced. The electronic device 501 may make a request to the second electronic device 521 for a schedule proposal by including only information on the first connection 510.

Figure 10B:
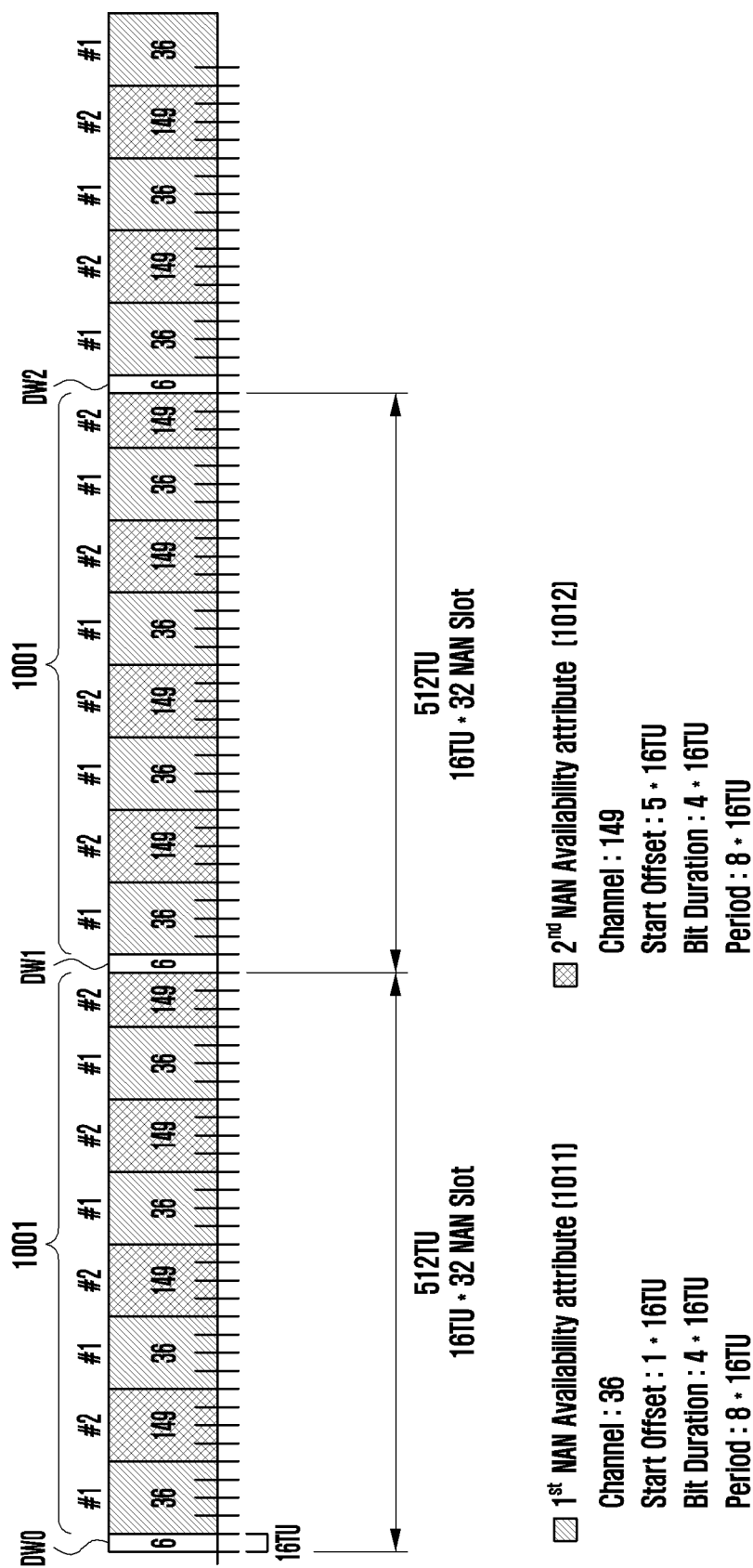
FIG. 10B illustrates a schedule response according to the second method shown in FIG. 9.

FIG. 10B illustrates a schedule response according to the embodiment shown in FIG. 9. The electronic device 501 may obtain the schedule response shown in FIG. 10B as a part of step 920 in FIG. 9. For example, the second electronic device 521 may obtain the schedule proposal shown in FIG. 10A, and may produce the schedule response shown in FIG. 10B in response thereto.

The second external electronic device 521 may recognize the schedule intended by the electronic device 501, and may propose modification of the schedule according to the intention of the electronic device 501. For example, a second NAN availability attribute 1012 may be added using an empty slot in the schedule proposal of the electronic device 501.

Referring to FIG. 10B, the second NAN availability attribute 1012 may be configured as a start offset of 5*16 TUs, a bit duration of 4*16 TUs, and a period of 8* 16 TUs so as to be included in an empty slot in the schedule proposal of the electronic device 501. The second external electronic device 521 may transmit, to the electronic device 501, a second message including the first NAN availability attribute 1011 proposed by the electronic device 501 and the second NAN availability attribute 1012 proposed by the second external electronic device 521.

Figure 10C:
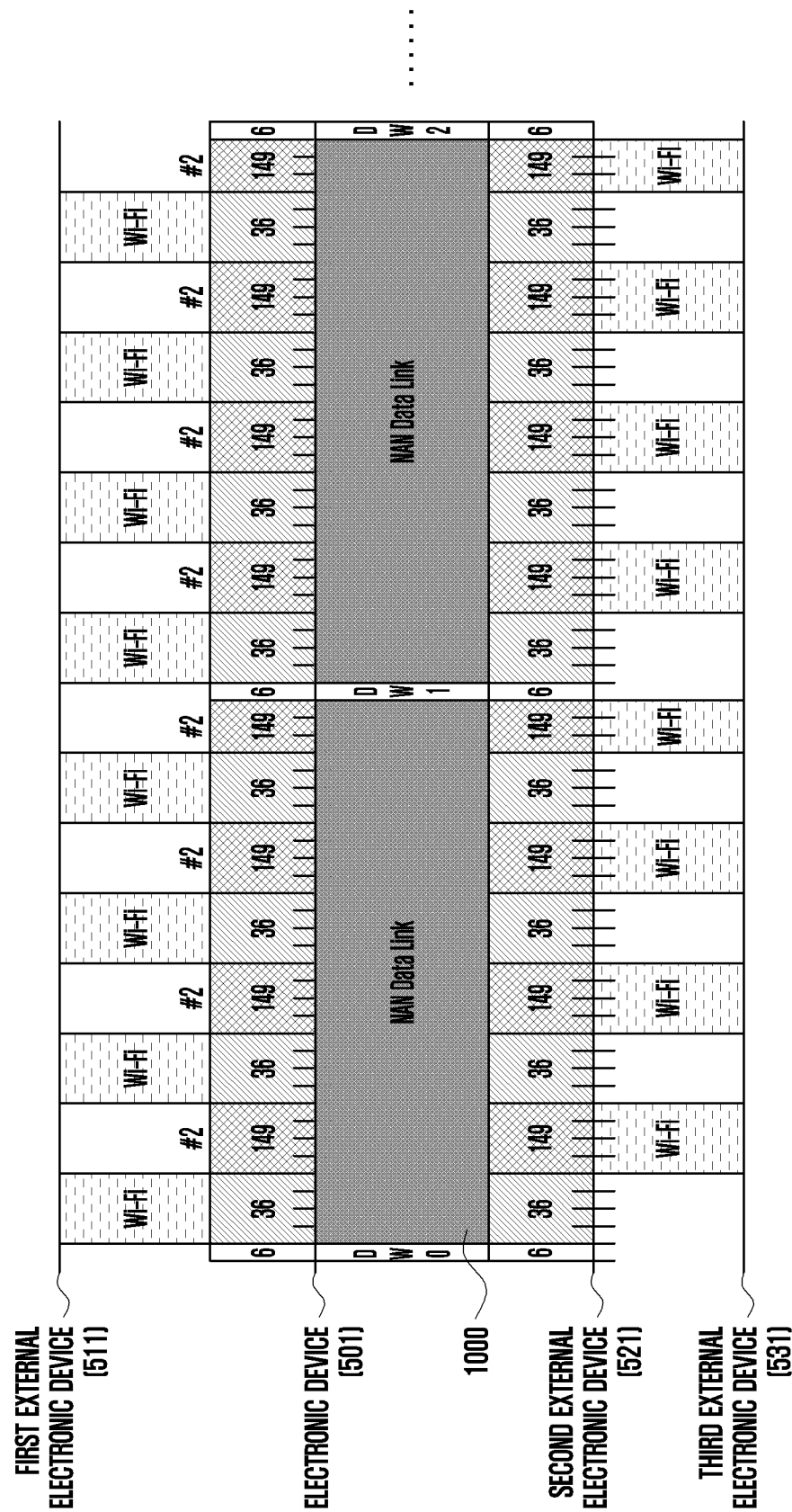
FIG. 10C illustrates an allocation range of a data link when scheduling is completed according to FIGS. 10A and 10B.

FIG. 10C illustrates an allocation range of a data link when scheduling is completed according to FIGS. 10A and 10B. For example, if the electronic device 501 "accepts" the schedule response included in the second message, the electronic device 501 and the second external electronic device 521 may perform channel switching (e.g., channel 36→channel 149) simultaneously to continue to perform data communication 1000. For example, the electronic device 501 may perform channel switching, based on a data link schedule proposal (e.g., a schedule response) based on the second communication protocol, which is received from the second external device 521. A NAN data link may be scheduled in a manner similar to the embodiment shown in FIG. 8B.

Figure 11:
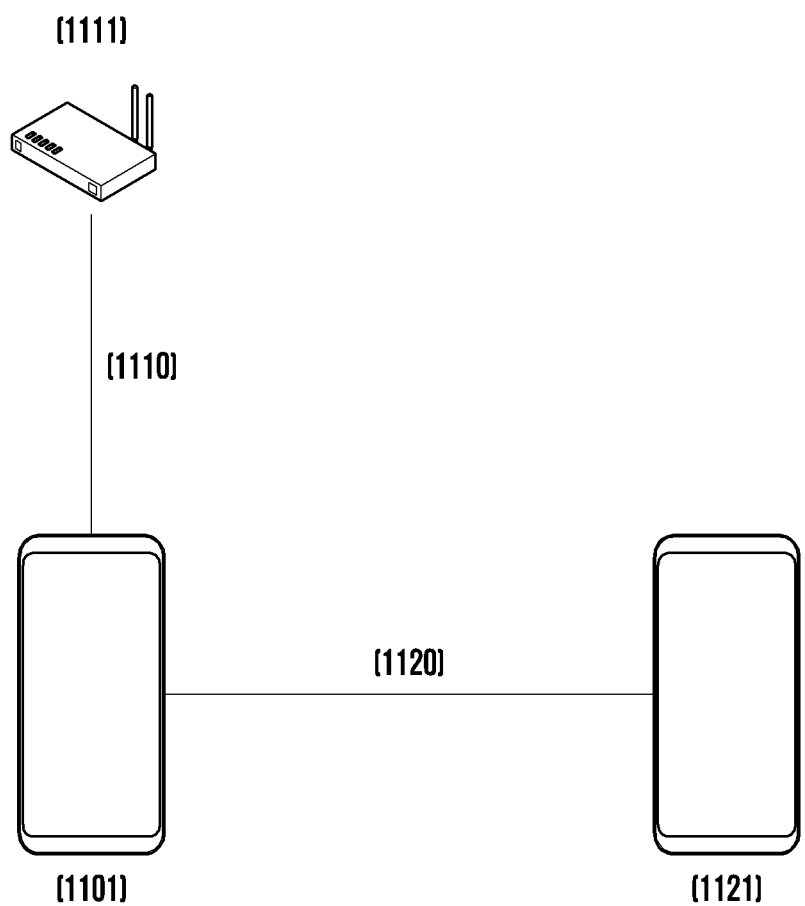
FIG. 11 illustrates an example of a system according to an embodiment.

FIG. 11 illustrates an example of a system configuration according to various embodiments.

Referring to FIG. 11, the electronic device 1101 may establish a first connection 1110 based on a first communication protocol (e.g., Wi-Fi) with the first external electronic device 1111. For example, the electronic device 1101 and the first external electronic device 1111 may negotiate a channel (e.g., channel 36) for communication, and the electronic device 1101 and the first external electronic device 1111 may establish a first connection 1110 using the negotiated channel, thereby transmitting and receiving data.

The electronic device 1101 may identify a second external electronic device 1121 capable of establishing a second connection 1120 using a second communication protocol (e.g., NAN). For example, the electronic device 1101 may transmit and receive a beacon, an SDF, or an NAF within a synchronized time duration (e.g., a DW), thereby identifying the second external electronic device 1121.

The electronic device 1101 may schedule a data path based on the second communication protocol in consideration of information related to the first connection 1110. For example, the electronic device may configure at least one FAW in an interval between synchronized time durations, and may perform data communication.

Figure 12:
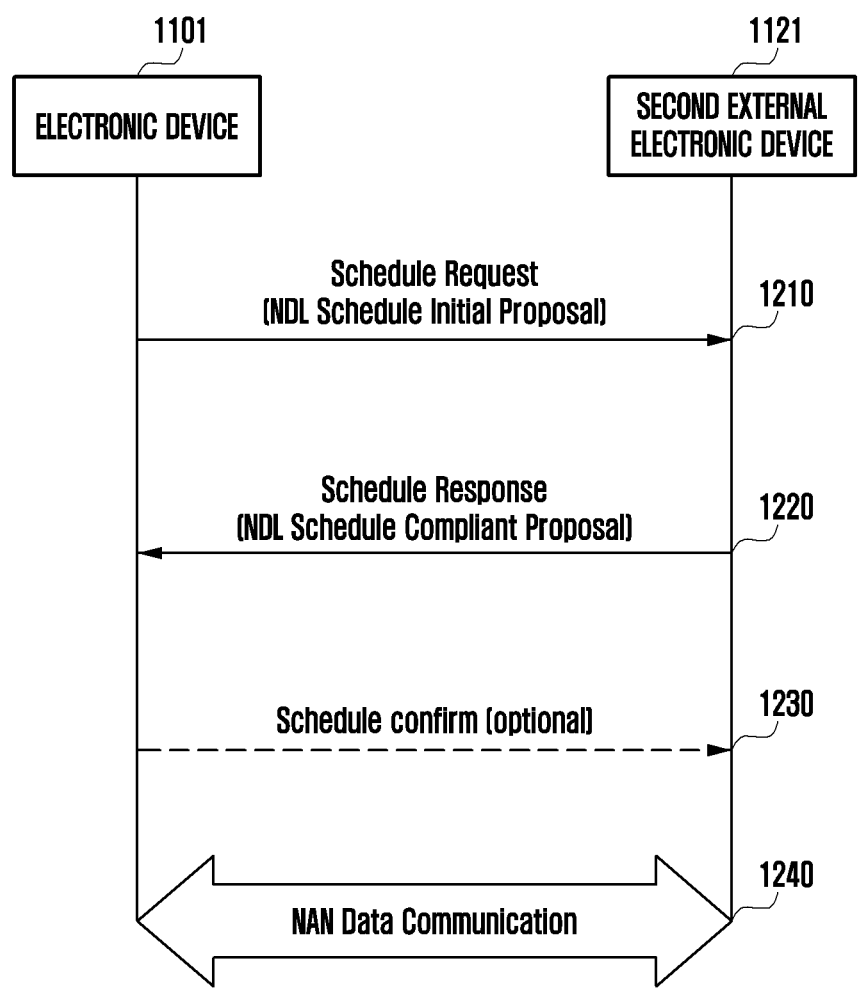
FIG. 12 illustrates a method of scheduling a communication data link in a system according to an embodiment.

FIG. 12 illustrates a method of scheduling a communication data link in a system according to an embodiment. The electronic device 1101 may perform the steps described with reference to FIG. 12 in the system shown in FIG. 11.

Referring to FIG. 12, in step 1210, the electronic device 1101 may transmit (e.g., broadcast or unicast) a beacon, an SDF, or an NAF including a schedule proposal (e.g., a schedule request) as a first message. For example, at least one of the beacon, the SDF, or the NAF may include a NAN availability attribute and/or an unaligned schedule attribute, and the NAN availability attribute and/or the unaligned schedule attribute may include a data link schedule proposal based on a second communication protocol.

In step 1220, the electronic device 1101 may receive, from a second external electronic device 1121, a second message in response to the first message using the second communication protocol. The second message may be configured as a schedule response including one of "acceptance", "refusal", or "modification proposal". The second external electronic device 1121 may recognize the schedule intended by the electronic device 1101, and may propose modification of the schedule conforming to the intention of the electronic device 1101.

In step 1230, if the second message includes "acceptance" or "modification proposal", the electronic device 1101 may transmit a schedule confirmation message in response to the second message using the second communication protocol. Based on the schedule confirmation message, the second electronic device 1121 may identify that the schedule was determined. Transmission of the schedule confirmation message may optionally be performed. For example, the electronic device 1101 may omit step 1230.

In step 1240, the electronic device 1101 may schedule a second-communication protocol-based data link, based at least in part on the second message received from the second external electronic device 1121, and may perform second-communication protocol-based (NAN) data communication with the second external electronic device 1121.

Figure 13A:
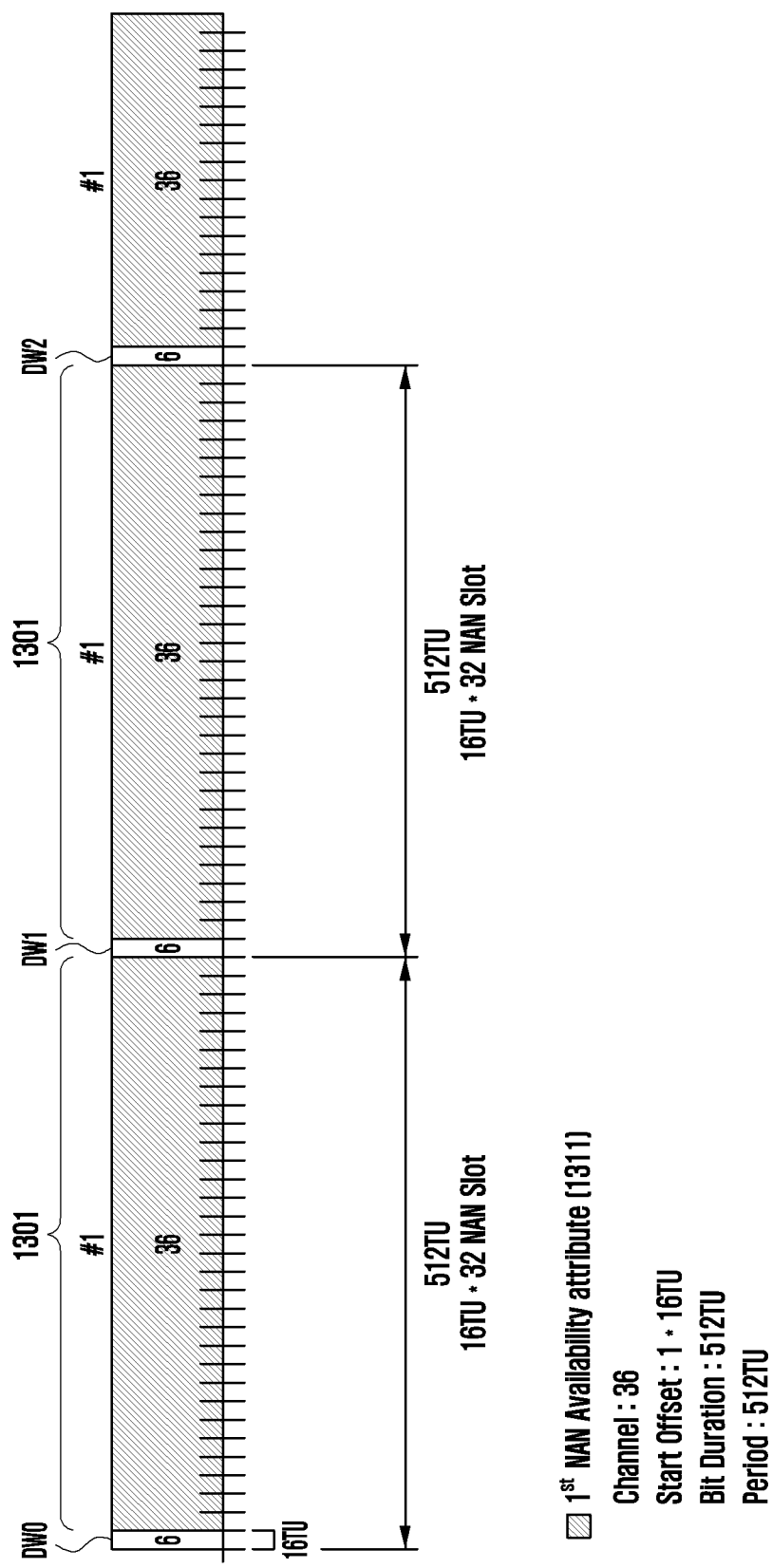
FIG. 13A illustrates a schedule proposal according to the method illustrated in FIG. 12.

FIG. 13A illustrates a schedule proposal according to the method illustrated in FIG. 12. The electronic device 1101 may produce the schedule proposal shown in FIG. 13A as a part of step 1210 described with reference to FIG. 12.

Referring to FIG. 13A, a data link schedule proposal (e.g., a schedule request) based on the second communication protocol may be included in a NAN availability attribute and/or an unaligned schedule attribute. In addition, the NAN availability attribute and/or the unaligned schedule attribute may be included in at least one of a beacon, an SDF, or an NAF.

The electronic device 1101 may schedule a data path based on the second communication protocol in consideration of information related to the first connection 1110. For example, the electronic device may configure at least one FAW in an interval 1301 between synchronized time durations (e.g., DW0, DW1, or DW2), and may schedule a data path.

A first NAN availability attribute 1311 may produce a FAW (e.g., NAN slot #1) configured as channel 36, a start offset of 1*16 TUs, a bit duration of 512 TUs, and a period of 512 TUs.

Figure 13B:
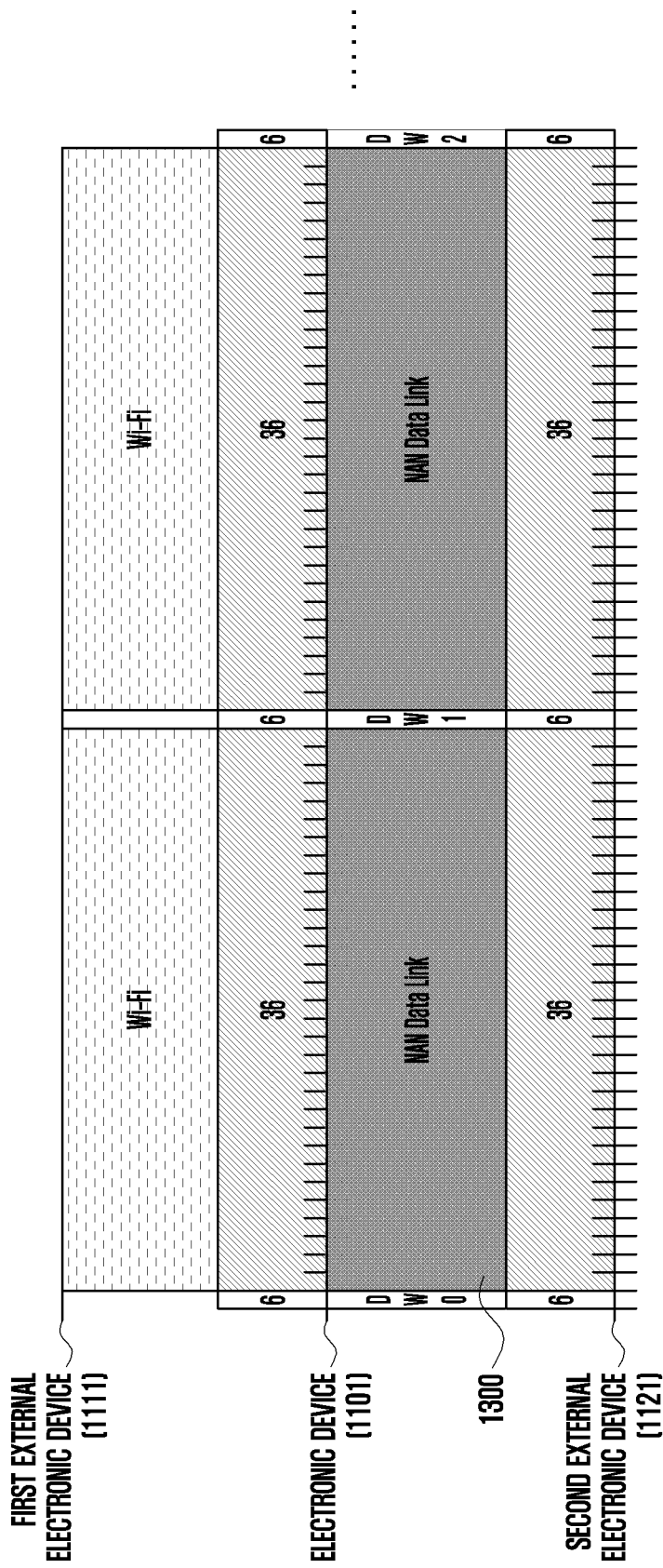
FIG. 13B illustrates an allocation range of a data link when the schedule proposal is accepted according to FIG. 13A.

FIG. 13B illustrates an allocation range of a data link when the schedule proposal is accepted according to FIG. 13A. For example, if the electronic device 1101 receives, from the second external device 1121, a second message including "acceptance" in response to the first message, the electronic device 1101 and the second external electronic device 1121 may continue to perform data communication 1300 using the same channel If the second external electronic device 1121 is not connected to another electronic device other than the electronic device 1101 (e.g., is not in the third connection 530 in FIG. 5), the electronic device 1101 and the second external electronic device 1121 may not require channel switching. For example, channel formation for data communication with another electronic device may not be required. Accordingly, the electronic device 1101 and the second external electronic device 1121 may perform data communication 1300 using the same channel without channel switching.

Figure 14:
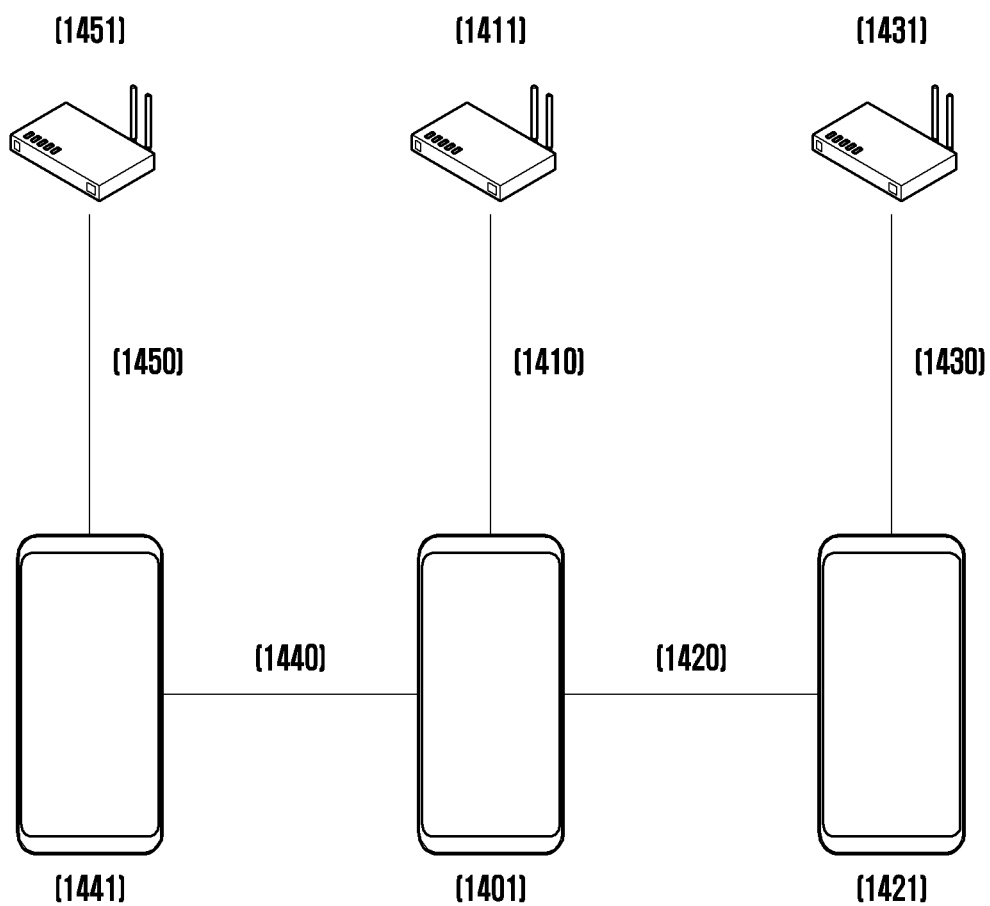
FIG. 14 illustrates an example of a system according to an embodiment.

FIG. 14 illustrates an example of a system according to an embodiment.

Referring to FIG. 14, an electronic device 1401 may establish a first connection 1410 based on a first communication protocol (e.g., Wi-Fi) with a first external electronic device 1411. For example, the electronic device 1401 and the first external electronic device 1411 may negotiate a channel for communication (e.g., channel 36), and the electronic device 1401 and the first external electronic device 1411 may establish a first connection 1410 using the negotiated channel, thereby transmitting and receiving data.

A second external electronic device 1421 capable of configuring a NAN cluster—based second connection 1420 with the electronic device 1401 may establish a third connection 1430 based on a third communication protocol (e.g., Wi-Fi or Wi-Fi direct) with a third external electronic device 1431. The second external electronic device 1421 may establish a third connection 1430 using a channel (e.g., channel 149) negotiated with the third external electronic device 1431, thereby transmitting and receiving data.

A fourth external electronic device 1441 capable of configuring a NAN cluster—based fourth connection 1440 with the electronic device 1401 may establish a fifth connection 1450 based on a third communication protocol (e.g., Wi-Fi or Wi-Fi Direct) with a fifth external electronic device 1451. The fourth external electronic device 1441 may establish a fifth connection 1450 using a channel (e.g., channel 48) negotiated with the fifth external electronic device 1451, thereby transmitting and receiving data.

The electronic device 1401 may identify the second external electronic device 1421 and the fourth external electronic device 1441 using the second communication protocol (e.g., a NAN). For example, the electronic device 1401 may transmit and receive a beacon, an SDF), or an NAF within a synchronized time duration (e.g., a DW), thereby identifying the second external electronic device 1421 and the fourth external electronic device 1441.

The electronic device 1401 may schedule a data path based on the second communication protocol in consideration of information related to the first connection 1410, the third connection 1430, and the fifth connection 1450. For example, the electronic device may configure at least one FAW in the interval between synchronized time durations, and may perform data communication. The electronic device 1401 may identify at least one of a NAN availability attribute, an extended WLAN infrastructure attribute, or an unaligned schedule attribute using at least one of a beacon, an SDF, or an NAF transmitted from the second external electronic device 1421 or the fourth external electronic device 1441. For example, the electronic device 1401 may identify information related to at least one of the third connection 1430 of the second external electronic device 1421 or the fourth connection 1450 of the fourth external electronic device 1441, based on at least one of the NAN availability attribute, the extended WLAN infrastructure attribute, or the unaligned schedule attribute.

Figure 15:
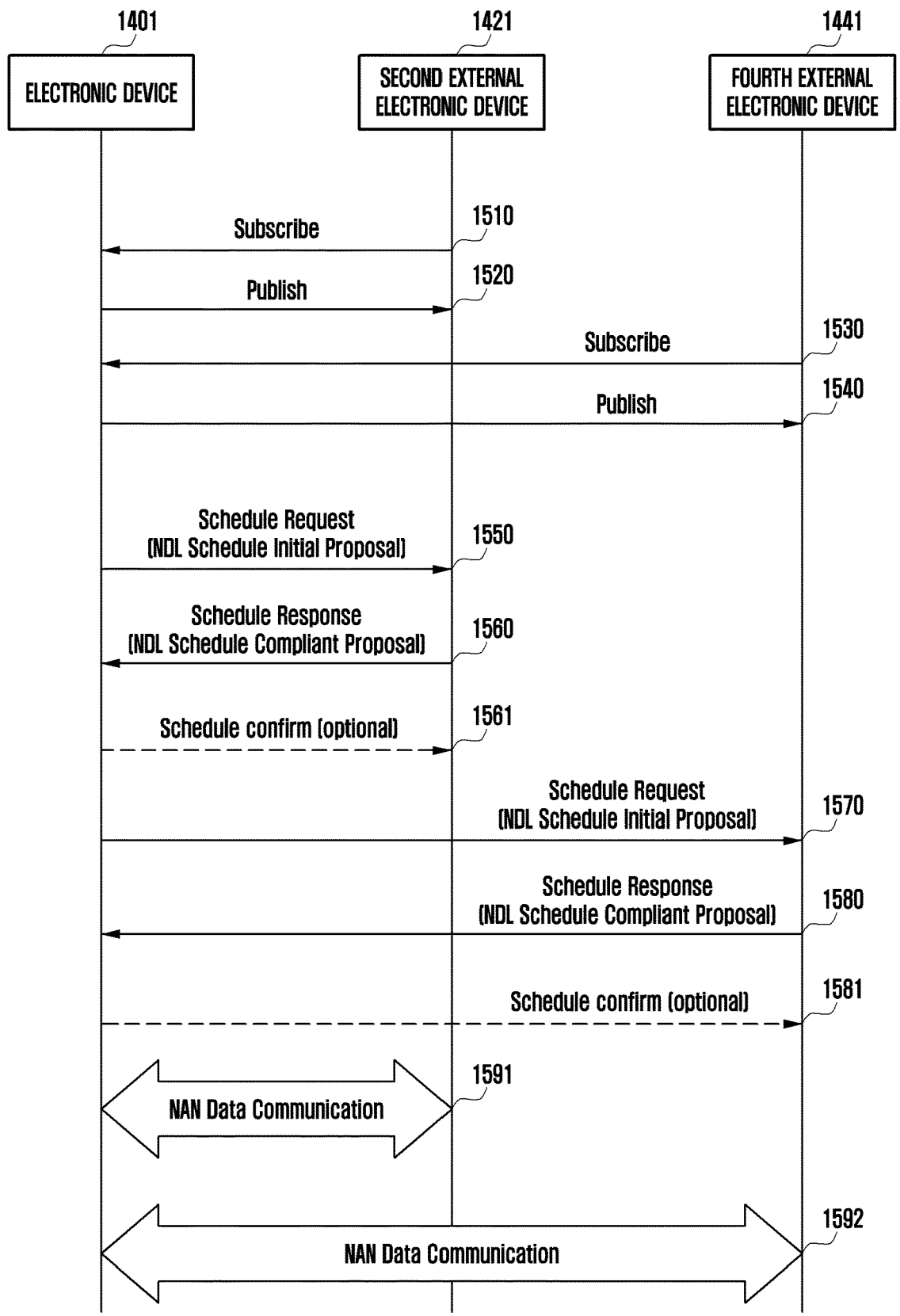
FIG. 15 illustrates a method of scheduling a communication data link in a system according to an embodiment.

FIG. 15 illustrates a method of scheduling a communication data link in a system according to an embodiment. The electronic device 1101 may perform the operations described with reference to FIG. 15 in the system shown in FIG. 14.

Referring to FIG. 15, in step 1510, the electronic device 1401 may subscribe to a discovery signal (e.g., a beacon) transmitted from the second external electronic device 1421. For example, if the second external electronic device 1421 broadcasts or unicasts a discovery signal, the electronic device 1401 may receive the broadcast or unicast discovery signal to subscribe to NAN service discovery. The discovery signal may include connection state information of the second external electronic device 1421. The electronic device 1401 may identify a connection state of the second external electronic device 1421 (e.g., the third connection 1430), based on the discovery signal transmitted from the second external electronic device 1421. For example, the electronic device 1401 may identify Wi-Fi channel information (e.g., channel 149) of the third connection 1430, based on the discovery signal received from the second external electronic device 1421.

In step 1520, the electronic device 1401 may publish a discovery signal including its own connection state information. For example, the electronic device 1401 may issue a beacon indicating the operation of a NAN service to the second external electronic device 1421. The second external electronic device 1421 may subscribe to a discovery signal issued from the electronic device 1401, and may identify a connection state of the electronic device 1401 (e.g., the first connection 1410).

In step 1530, the electronic device 1401 may subscribe to a discovery signal transmitted from the fourth external electronic device 1441. For example, if the fourth external electronic device 1441 broadcasts or unicasts a discovery signal, the electronic device 1401 may receive the broadcast or unicast discovery signal to subscribe to NAN service discovery. The discovery signal may include connection state information of the fourth external electronic device 1441. The electronic device 1401 may identify a connection state of the fourth external electronic device 1441 (e.g., the fifth connection 1450), based on the discovery signal transmitted from the fourth external electronic device 1441. For example, the electronic device 1401 may identify Wi-Fi channel information (e.g., channel 48) of the fifth connection 1450, based on the discovery signal received from the fourth external electronic device 1441.

In step 1540, the electronic device 1401 may publish a discovery signal including its own connection state information. For example, the electronic device 1401 may issue a beacon indicating the operation of a NAN service to the fourth external electronic device 1441. The fourth external electronic device 1441 may subscribe to a discovery signal issued from the electronic device 1401, and may identify a connection state of the electronic device 1401 (e.g., the first connection 1410).

The order of steps 1510 to 1540 may vary, or steps 1510 to 1540 may be performed simultaneously.

In step 1550, the electronic device 1401 may produce a first message, based at least in part on the first connection 1410, the third connection 1430, or the fifth connection 1450, and may transmit the same to the second external electronic device 1421. The first message may be included in at least one of a beacon, an SDF, or an NAF to then be transmitted to the second external electronic device 1421. The first message may be configured in the form of a NAN availability attribute and/or an unaligned schedule attribute. The electronic device 1401 may include a data link schedule proposal (e.g., a schedule request) based on the second communication protocol in the NAN availability attribute and/or the unaligned schedule attribute.

In step 1560, the electronic device 1401 may receive, from the second external electronic device 1421, a second message in response to the first message using the second communication protocol. The second message may be configured as a schedule response including one of "acceptance", "refusal", or "modification proposal".

In step 1561, if the second message includes "acceptance" or "modification proposal", the electronic device 1401 may transmit a schedule confirmation message in response to the second message using the second communication protocol. Based on the schedule confirmation message, the second external electronic device 1421 may identify that the schedule was determined. Transmission of the schedule confirmation message may optionally be performed. For example, the electronic device 1401 may omit step 1561.

In step 1570, the electronic device 1401 may transmit the first message to the fourth external electronic device 1441 using the second communication protocol. The first message may be included in at least one of a beacon, an SDF, or an NAF to then be transmitted to the fourth external electronic device 1441. The first message may be configured in the form of a NAN availability attribute and/or an unaligned schedule attribute. The electronic device 1401 may include a data link schedule proposal (e.g., a schedule request) based on the second communication protocol in the NAN availability attribute and/or the unaligned schedule attribute.

In step 1580, the electronic device 1401 may receive, from the fourth external electronic device 1441, a third message in response to the first message. The third message may be configured as a schedule response including one of "acceptance", "refusal", or "modification proposal".

In step 1581, if the third message includes "acceptance" or "modification proposal", the electronic device 1401 may transmit a schedule confirmation message in response to the third message using the second communication protocol. Based on the schedule confirmation message, the fourth external electronic device 1441 may identify that the schedule was determined. Transmission of the schedule confirmation message may optionally be performed. For example, the electronic device 1401 may omit step 1581.

In step 1591, the electronic device 1401 may schedule a data link based on the second communication protocol, based at least in part on the second message received from the second external electronic device 1421, and may perform second-communication protocol-based (NAN) data communication with the second external electronic device 1421.

In step 1592, the electronic device 1401 may schedule a second-communication protocol-based (NAN) data link, based at least in part on the third message received from the fourth external electronic device 1441, and may perform second-communication protocol-based data communication with the fourth external electronic device 1441.

Figure 16A:
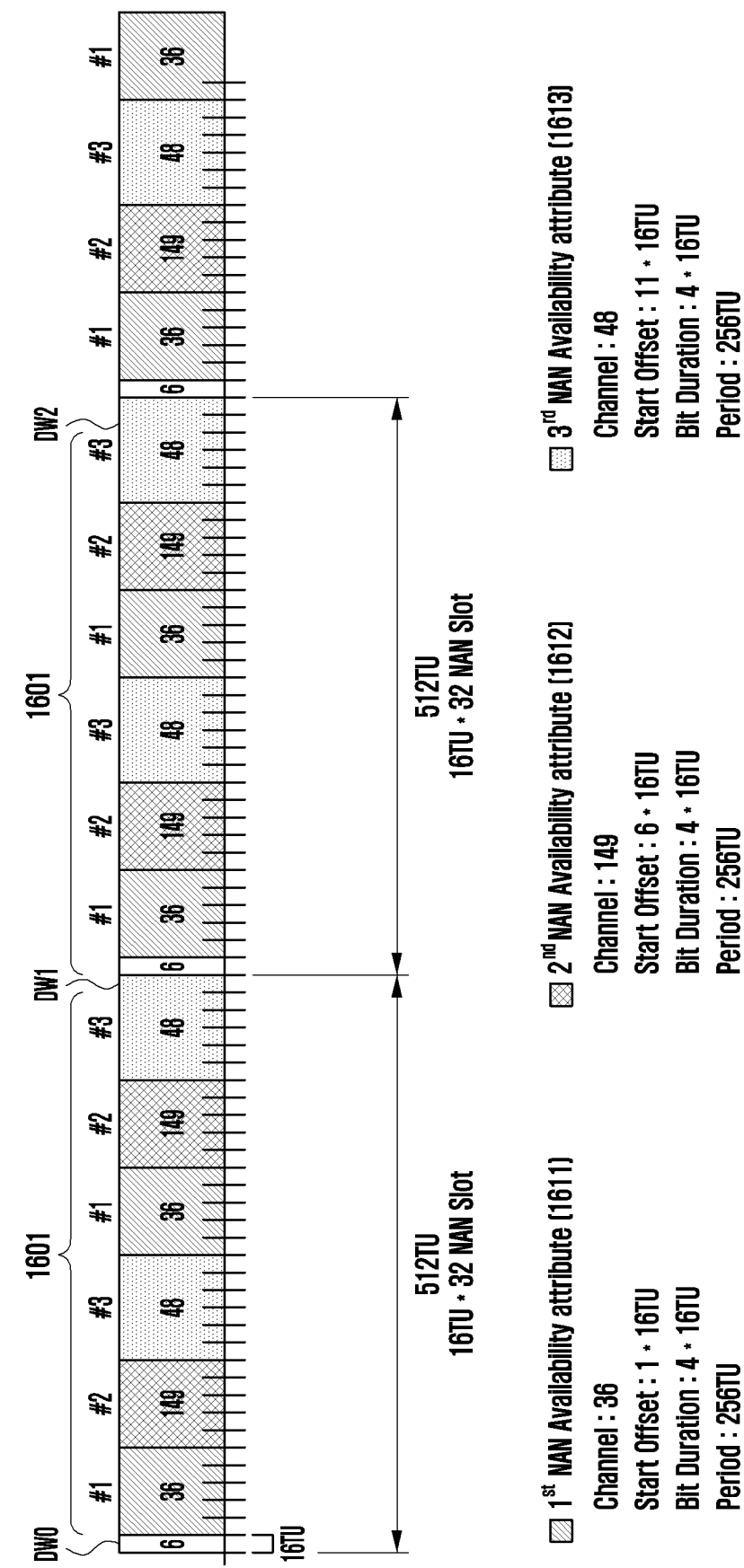
FIGS. 16A and 16B illustrate a schedule proposal according to the method illustrated in FIG. 15.

FIG. 16A illustrates a schedule proposal according to the method illustrated in FIG. 15. The electronic device 1401 may produce the schedule proposal shown in FIG. 16A as a part of step 1550 or 1570 described with reference to FIG. 15.

A data link schedule proposal (e.g., a schedule request) based on the second communication protocol may be included in a first message configured in the form of a NAN availability attribute and/or an unaligned schedule attribute. In addition, the NAN availability attribute and/or the unaligned schedule attribute may be included in at least one of a beacon, an SDF, or an NAF.

The electronic device 1401 may produce a second-communication protocol-based data path schedule proposal, based at least in part on the first connection 1410, the third connection 1430, and/or the fifth connection 1450. For example, the electronic device may configure at least one FAW in an interval 1601 between synchronized time durations (e.g., DW0, DW1, or DW2), and may schedule a data path.

Referring to FIG. 16A, a first NAN availability attribute 1611 may produce a FAW (e.g., NAN slot #1) configured as channel 36, a start offset of 1*16 TUs, a bit duration of 4*16 TUs, and a period of 12*16 TUs. As another example, a second NAN availability attribute 1612 may produce a FAW (e.g., NAN slot #2) configured as channel 149, a start offset of 5*16 TUs, a bit duration of 4*16 TUs, and a period of 12*16 TUs. As another example, a third NAN availability attribute 1613 may produce a FAW (e.g., NAN slot #3) configured as channel 48, a start offset of 9*16 TUs, a bit duration of 4*16 TUs, and a period of 12*16 TUs. The first availability attribute 1611, the second NAN availability attribute 1612, and/or the third NAN availability attribute 1613 may include band information on the respective FAWs.

Figure 16B:
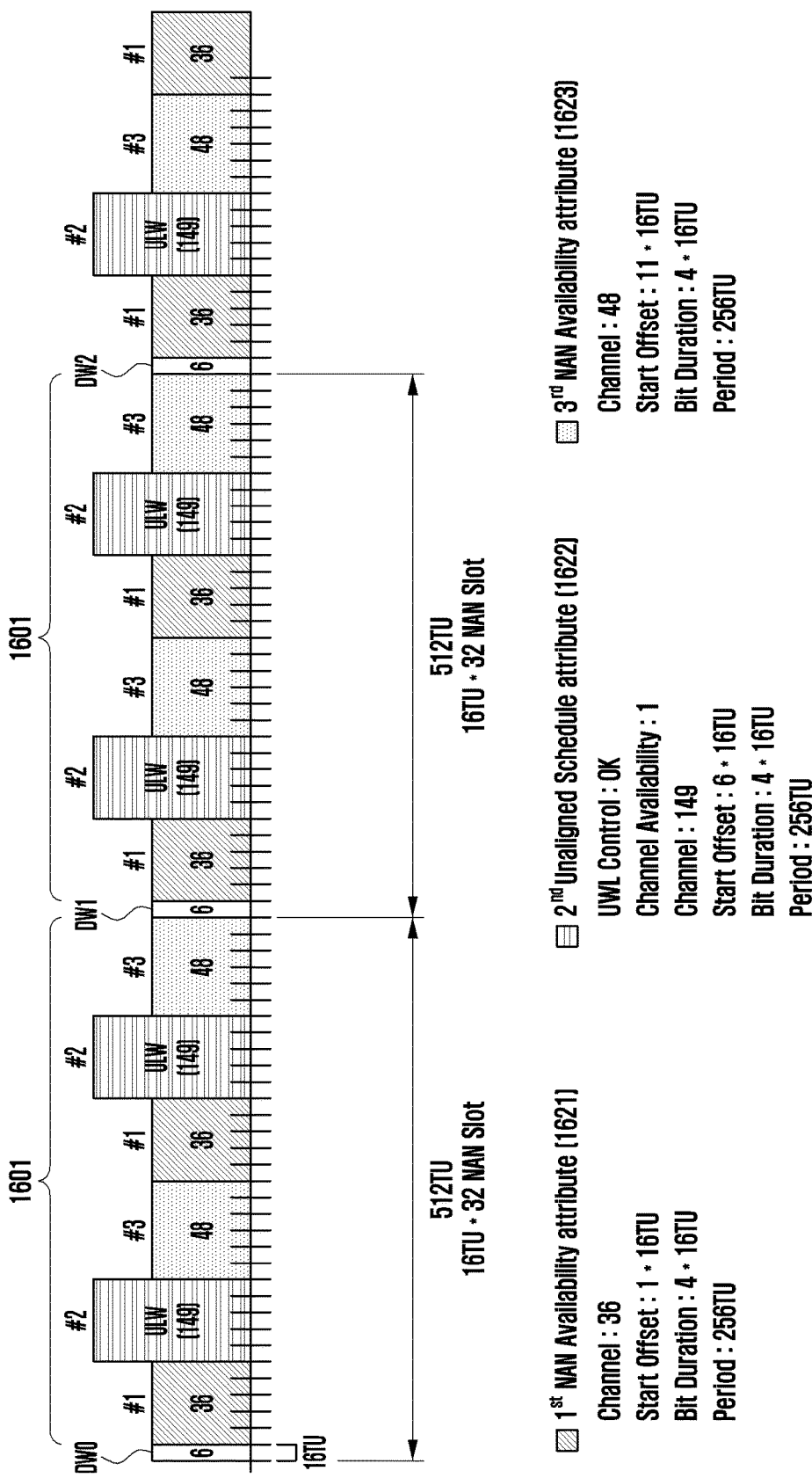

FIG. 16B illustrates a schedule proposal according to the method illustrated in FIG. 15. The electronic device 1401 may produce the schedule proposal shown in FIG. 16B as a part of step 1550 or 1570 described with reference to FIG. 15.

FIG. 16B illustrates when an unaligned schedule attribute is included. For example, a first NAN availability attribute 1621 may produce a FAW (e.g., NAN slot #2) configured as channel 36, a start offset of 1*16 TUs, a bit duration of 4*16 TUs, and a period of 12*16 TUs. As another example, a second unaligned schedule attribute 1622 may produce a FAW (e.g., NAN slot #2) configured as channel 149, a start offset of 5* 16 TUs, a bit duration of 4*16 TUs, and a period of 12*16 TUs. As another example, a third NAN availability attribute 1623 may produce a FAW (e.g., NAN slot #3) configured as channel 48, a start offset of 9*16 TUs, a bit duration of 4*16 TUs, and a period of 12*16 TUs.

Figure 16C:
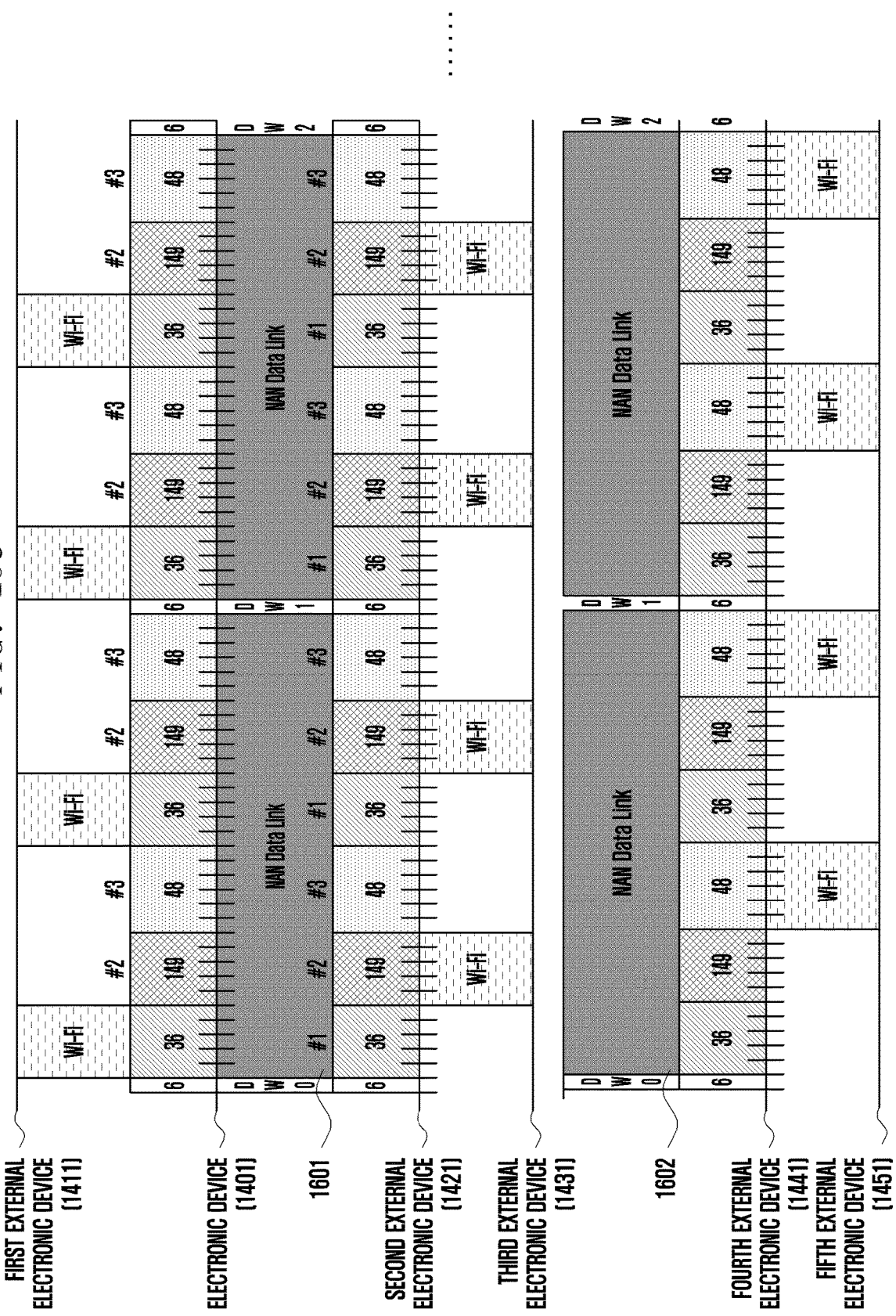
FIG. 16C illustrates an allocation range of a data link when scheduling of the electronic device is completed according to the scheduling proposal of FIG. 16A or FIG. 16B.

FIG. 16C illustrates an allocation range of a data link when scheduling of the electronic device is completed according to the method of FIG. 16A or 16B. For example, if the electronic device 1401 receives, from the second external device 1421, a second message including "acceptance" in response to the first message, and if the electronic device 1401 receives, from the fourth external device 1441, a third message including "acceptance" in response to the first message, the electronic device 1401, the second external electronic device 1421, and the fourth external electronic device 1441 may continue to perform data communication 1601 or 1602 while performing channel switching (e.g., channel 36→channel 149→channel 48) simultaneously. For example, the second external electronic device 1421 and the fourth external electronic device 1441 may perform channel switching, based on the second-communication protocol-based data link schedule proposal (e.g., a schedule request) received from the electronic device 1401.

An electronic device according to embodiments disclosed herein may include a portable communication device (e.g., a smart phone), a computer device, a portable multimedia device, a portable medical device, a camera, a wearable device, or a home appliance. The electronic devices are not limited to those described above.

As used herein, the term "module" may include a unit implemented in hardware, software, or firmware, and may interchangeably be used with other terms such as "logic," "logic block," "part," or "circuitry". A module may be a single integral component, or a minimum unit or part thereof, adapted to perform one or more functions. For example, the module may be implemented in a form of an application-specific integrated circuit (ASIC).

Embodiments as set forth herein may be implemented as software including one or more instructions that are stored in a storage medium that is readable by a machine. For example, a processor of the machine may invoke and execute at least one of the one or more instructions stored in the storage medium, thereby enabling the machine to be operated to perform at least one function according to the invoked at least one instruction. The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal, but does not differentiate between where data is semi-permanently and temporarily stored in the storage medium.

A method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more components of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, one or more of the operations may be executed in a different order or omitted, or one or more other operations may be added.

Although embodiments of the present disclosure have been described in detail herein, it should be clearly understood that many variations and modifications of the present disclosure herein described, which may appear to those skilled in the art, will still fall within the spirit and scope of the of the present disclosure as defined in the appended claims and their equivalents.

What is claimed is:

1. An electronic device comprising:
a communication module configured to support a first communication protocol and a second communication protocol;
a processor operably connected to the communication module; and
a memory operably connected to the processor,
wherein the memory stores instructions that, when executed, enable the processor to:
establish a first connection based on the first communication protocol with a first external electronic device;
obtain identification information corresponding to a second external electronic device and communication information of the second external electronic device using the second communication protocol;
produce a first message including a proposed schedule related to at least one further available window (FAW) determined based at least in part on information about the first connection and the communication information of the second external electronic device, the at least one determined FAW being included in an interval between synchronized time durations;
transmit the produced first message to the second external electronic device using the second communication protocol;
receive, from the second external electronic device, a second message in response to the first message using the second communication protocol, the second message including one of acceptance, refusal, or a modification proposal of the proposed schedule; and
schedule, based at least in part on the received second message, a data link with the second external electronic device based on the second communication protocol.

2. The electronic device of claim 1,
wherein the first communication protocol supports a communication operation other than a neighbor awareness networking (NAN) communication operation, and
wherein the second protocol supports the NAN communication operation.

3. The electronic device of claim 1,
wherein the first message or the second message is included in at least one of a beacon, a service discovery frame (SDF), and a NAN action frame (NAF), which is transmitted within a synchronized time duration.

4. The electronic device of claim 3,
wherein the first message or the second message comprises one of a NAN availability attribute, an extended wireless local area network (WLAN) infrastructure attribute, and an unaligned schedule attribute.

5. The electronic device of claim 1,
wherein the first message comprises at least one of channel information, band information, a start offset, a bit duration, and a period related to the at least one determined FAW.

6. An electronic device comprising:
a communication module configured to support a first communication protocol and a second communication protocol;
a processor operably connected to the communication module; and
a memory operably connected to the processor,
wherein the memory stores instructions that, when executed, enable the processor to:
establish a first connection based on the first communication protocol with a first external electronic device;
produce a first message including a proposed schedule related to at least one further available window (FAW) determined based at least in part on information about the first connection, the at least one determined FAW being included in an interval between synchronized time durations;
transmit the produced first message using the second communication protocol;
receive, from a second external electronic device, a second message in response to the first message using the second communication protocol, the second message including one of acceptance, refusal, or a modification proposal of the proposed schedule; and
schedule, based at least in part on the received second message, a data link with the second external electronic device based on the second communication protocol.

7. The electronic device of claim 6,
wherein the first communication protocol supports a communication operation other than a neighbor awareness networking (NAN) communication operation, and
wherein the second protocol supports the NAN communication operation.

8. The electronic device of claim 6,
wherein the first message or the second message is included in at least one of a beacon, a service discovery frame (SDF), and a NAN action frame (NAF), which is transmitted within a synchronized time duration.

9. The electronic device of claim 8,
wherein the first message or the second message comprises one of a NAN availability attribute, an extended wireless local area network (WLAN) infrastructure attribute, and an unaligned schedule attribute.

10. The electronic device of claim 6,
wherein the first message comprises at least one of channel information, band information, a start offset, a bit duration, and a period related to the at least one determined FAW.

11. A method of scheduling a communication data link of an electronic device, the method comprising:
establishing a first connection based on the first communication protocol with a first external electronic device;
obtaining identification information corresponding to a second external electronic device and communication information of the second external electronic device using the second communication protocol;
producing a first message including a proposed schedule related to at least one further available window (FAW) determined based at least in part on information about the first connection and the communication information of the second external electronic device, the at least one determined FAW being included in an interval between synchronized time durations;
transmitting the produced first message to the second external electronic device using the second communication protocol;
receiving, from the second external electronic device, a second message in response to the first message using the second communication protocol, the second message including one of acceptance, refusal, or a modification proposal of the proposed schedule; and
scheduling, based at least in part on the received second message, a data link with the second external electronic device based on the second communication protocol.

12. The method of claim 11,
wherein the first communication protocol supports a communication operation other than a neighbor awareness networking (NAN) communication operation, and
wherein the second protocol supports the NAN communication operation.

13. The method of claim 11,
wherein the first message or the second message is included in at least one of a beacon, a service discovery frame (SDF), and a NAN action frame (NAF), which is transmitted within a synchronized time duration.

14. The electronic device of claim 1,
wherein the communication information of the second external electronic device comprises information including at least one of a connection state between the second external electronic device and a third external electronic device, channel information being used by the second external electronic device and an available channel of the second external electronic device.

15. The electronic device of claim 1,
wherein the first message further includes channel information related to the at least one FAW determined based at least in part on channel information related to the first connection and a communication information connection state of the second external electronic device.

16. The electronic device of claim 6,
wherein the second message comprises information including at least one of a connection state between the second external electronic device and a third external electronic device, channel information being used by the second external electronic device and an available channel of the second external electronic device.

17. The method of claim 11,
wherein the communication information of the second external electronic device comprises information including at least one of a connection state between the second external electronic device and a third external electronic device, channel information being used by the second external electronic device and an available channel of the second external electronic device.

18. The method of claim 12,
wherein the first message further includes channel information related to the at least one FAW determined based at least in part on channel information related to the first connection and the communication information of the second external electronic device.

* * * * *